(12) United States Patent
Lee et al.

(10) Patent No.: US 12,351,508 B2
(45) Date of Patent: Jul. 8, 2025

(54) GLASS ARTICLE AND METHOD FOR PRODUCING THE SAME

(71) Applicant: Samsung Display Co., Ltd., Yongin-Si (KR)

(72) Inventors: Hoi Kwan Lee, Suwon-si (KR); Sung Hoon Kim, Seoul (KR); Seung Ho Kim, Asan-si (KR); Sook Kyung You, Seoul (KR); An Na Ryu, Hwaseong-si (KR); Jeong Seok Lee, Suwon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/205,593

(22) Filed: Jun. 5, 2023

(65) Prior Publication Data

US 2023/0303435 A1    Sep. 28, 2023

Related U.S. Application Data

(62) Division of application No. 16/162,321, filed on Oct. 16, 2018, now Pat. No. 11,708,301.

(30) Foreign Application Priority Data

Feb. 12, 2018    (KR) .................. 10-2018-0016742

(51) Int. Cl.
  *B24B 1/00*    (2006.01)
  *B32B 17/10*    (2006.01)
  (Continued)

(52) U.S. Cl.
  CPC .............. *C03C 21/002* (2013.01); *B24B 1/00* (2013.01); *B32B 17/10128* (2013.01);
  (Continued)

(58) Field of Classification Search
  None
  See application file for complete search history.

(56) References Cited

U.S. PATENT DOCUMENTS

| | | | |
|---|---|---|---|
| 2,713,286 A * | 7/1955 | Taylor | .................. C03C 15/00 501/75 |
| 4,080,188 A | 3/1978 | Doddato et al. | |

(Continued)

FOREIGN PATENT DOCUMENTS

| | | |
|---|---|---|
| CN | 104736495 A | 6/2015 |
| CN | 104870393 A | 8/2015 |

(Continued)

OTHER PUBLICATIONS

Partial European search report, EP19156532.4, Dated Jul. 2, 2019, 31pages.

(Continued)

*Primary Examiner* — Shamim Ahmed
(74) *Attorney, Agent, or Firm* — Innovation Counsel LLP

(57) ABSTRACT

A method for producing a glass article is provided. The method for producing a glass article, the method including preparing a glass to be processed, the glass comprising a glass bulk and a low-refractive surface layer disposed on the glass bulk, and etching away the low-refractive surface layer to form an etched glass, wherein the etching away the low-refractive surface layer comprises: cleaning the low-refractive surface layer with an acid solution; and cleaning the low-refractive surface layer with a base solution after the cleaning it with the acid solution.

15 Claims, 17 Drawing Sheets

(51) Int. Cl.
    *C03C 3/04*         (2006.01)
    *C03C 15/00*       (2006.01)
    *C03C 19/00*       (2006.01)
    *C03C 21/00*       (2006.01)

(52) U.S. Cl.
    CPC ............... *C03C 3/04* (2013.01); *C03C 15/00* (2013.01); *C03C 19/00* (2013.01)

(56) References Cited

U.S. PATENT DOCUMENTS

| | | | |
|---|---|---|---|
| 8,906,506 | B2 | 12/2014 | Shibata et al. |
| 9,096,463 | B2 | 8/2015 | Hashimoto et al. |
| 9,359,251 | B2 | 6/2016 | Bookbinder et al. |
| 9,487,434 | B2 | 11/2016 | Amin et al. |
| 9,718,727 | B2 | 8/2017 | Bookbinder et al. |
| 9,828,278 | B2 | 11/2017 | Zhang et al. |
| 9,828,286 | B2 | 11/2017 | Kashima et al. |
| 9,884,784 | B2 | 2/2018 | Kashima et al. |
| 10,308,549 | B2 | 6/2019 | Kashima et al. |
| 10,450,226 | B2 | 10/2019 | Kashima et al. |
| 10,759,694 | B2 | 9/2020 | Lee et al. |
| 10,899,659 | B2 | 1/2021 | DeMartino et al. |
| 11,708,301 | B2 | 7/2023 | Lee et al. |
| 2010/0167059 | A1* | 7/2010 | Hashimoto ............ C03C 21/00 428/428 |
| 2011/0165393 | A1 | 7/2011 | Bayne et al. |
| 2013/0224492 | A1 | 8/2013 | Bookbinder et al. |
| 2013/0236666 | A1 | 9/2013 | Bookbinder et al. |
| 2013/0273324 | A1* | 10/2013 | Moll ................... B44C 1/228 428/161 |
| 2014/0087193 | A1 | 3/2014 | Cites et al. |
| 2014/0248495 | A1 | 9/2014 | Matsuda et al. |
| 2014/0370264 | A1 | 12/2014 | Ohara et al. |
| 2015/0030834 | A1 | 1/2015 | Morey et al. |
| 2015/0132538 | A1 | 5/2015 | Cleary et al. |
| 2016/0023944 | A1 | 1/2016 | Bookbinder et al. |
| 2016/0130178 | A1 | 5/2016 | Kashima et al. |
| 2016/0130179 | A1 | 5/2016 | Kashima et al. |
| 2016/0207828 | A1* | 7/2016 | Kashima ................. G01B 5/28 |
| 2016/0214889 | A1* | 7/2016 | Garner ................... C03C 3/089 |
| 2016/0225396 | A1* | 8/2016 | Shimojima ........... C03C 21/002 |
| 2016/0357294 | A1 | 12/2016 | Ozeki et al. |
| 2017/0107144 | A1 | 4/2017 | Horie et al. |
| 2017/0129806 | A1 | 5/2017 | Fujii et al. |
| 2017/0144923 | A1 | 5/2017 | Jin et al. |
| 2017/0197875 | A1* | 7/2017 | Fujii ................. G02B 27/0006 |
| 2017/0197876 | A1* | 7/2017 | Oram .................... C03C 3/097 |
| 2017/0226007 | A1 | 8/2017 | Garner et al. |
| 2017/0297956 | A1 | 10/2017 | Bookbinder et al. |
| 2018/0072619 | A1 | 3/2018 | Kashima et al. |
| 2019/0241468 | A1 | 8/2019 | Kim et al. |
| 2020/0399174 | A1 | 12/2020 | Garner et al. |
| 2023/0303435 | A1 | 9/2023 | Lee et al. |

FOREIGN PATENT DOCUMENTS

| | | |
|---|---|---|
| CN | 105814004 A | 7/2016 |
| CN | 106232541 A | 12/2016 |
| JP | 2011-187155 A | 9/2011 |
| JP | 2015-511573 A | 4/2015 |
| JP | 2016-216330 A | 12/2016 |
| JP | 2017-75078 A | 4/2017 |
| KR | 10-2010-0114138 A | 10/2010 |
| KR | 10-1214524 B1 | 12/2012 |
| KR | 10-2016-0034296 A | 3/2016 |
| KR | 10-2019-0095971 A | 8/2019 |
| KR | 10-2019-0098281 A | 8/2019 |
| TW | 2013-41324 A | 10/2013 |
| TW | 2015-12135 A | 4/2015 |
| WO | 2014084096 A1 | 6/2014 |
| WO | 2015-008760 A1 | 1/2015 |
| WO | 2015-008763 A1 | 1/2015 |
| WO | 2016010009 A1 | 1/2016 |
| WO | 2018008359 A1 | 1/2018 |

OTHER PUBLICATIONS

Extended European Search Report, Application No. 19156532.4, dated Oct. 23, 2019 , 45 pages.
Dong-In Lee et al., "Characterization of Glasses by Ion-Exchange( I )", Journal of the Korean Ceramic Society. 1988, vol. 25, pp. 237-242., 6 pages.
Korean Notice of Allowance corresponding to Application No. 10-2023-0128145 and issued on Nov. 8, 2024, 3 pages.

* cited by examiner

GLASS ARTICLE AND METHOD FOR PRODUCING THE SAME

CROSS-REFERENCE TO RELATED APPLICATION

This application is a divisional application of U.S. patent application Ser. No. 16/162,321 filed on Oct. 16, 2019, which claims priority under 35 USC § 119 to Korean Patent Application No. 10-2018-0016742, filed on Feb. 12, 2018 in the Korean Intellectual Property Office, the disclosure of which is incorporated herein by reference in its entirety.

BACKGROUND

1. Field of the Disclosure

The present disclosure relates to a glass article and a method for producing the same.

2. Description of the Related Art

Glass articles are widely used in electronic devices or construction materials including display devices. For example, glass articles are employed as a substrate for a flat display device such as a liquid-crystal display (LCD), an organic light-emitting display (OLED) and an electrophoretic display (EPD), or a window for protecting it.

As portable electronic devices such as smart phones and tablet PCs prevail, a glass article employed thereby is frequently exposed to external impact. Accordingly, what is required is a glass article that is thin and thus easy to carry and has good strength for withstanding external impact.

SUMMARY

Aspects of the present disclosure provide a method for producing a glass article having a good strength.

Aspects of the present disclosure also provide a glass article having a good strength.

It should be noted that objects of the present disclosure are not limited to the above-mentioned object; and other objects of the present invention will be apparent to those skilled in the art from the following descriptions.

According to an aspect of the present disclosure, there is provided a method for producing a glass article, the method including preparing a glass to be processed, the glass comprising a glass bulk and a low-refractive surface layer disposed on the glass bulk, and etching away the low-refractive surface layer to form an etched glass, wherein the etching away the low-refractive surface layer comprises: cleaning the low-refractive surface layer with an acid solution; and cleaning the low-refractive surface layer with a base solution after the cleaning it with the acid solution.

According to another aspect of the present disclosure, there is provided a method for producing a glass article including preparing a glass to be processed, the glass comprising a glass bulk and a low-refractive surface layer disposed on the glass bulk, and polishing a surface of the glass to form a polished glass, wherein the polishing the surface of the glass comprises: removing at least partially the low-refractive surface layer.

According to another aspect of the present disclosure, there is provided a method for producing a glass article including preparing a glass to be processed that has a first surface and a second surface opposed to the first surface, wherein the glass has a first maximum compressive stress at the first surface and a second maximum compressive stress at the second surface, and polishing the first surface and/or the second surface to reduce deviations between the first maximum compressive stress and the second maximum compressive stress.

According to an aspect of the present disclosure, there is provided a glass article comprising a glass comprising glass bulk and a low-refractive surface layer disposed on the glass bulk, the glass comprising a compressive region disposed adjacent to a surface of the glass and a tensile region disposed inside the glass, wherein a refractive index of the low-refractive surface layer is smaller than a refractive index of the glass bulk and is greater than a refractive index of air, wherein the low-refractive surface layer is disposed within the compressive region, and wherein a thickness of the low-refractive surface layer is less than 100 nm and is smaller than a compression depth of the compressive region.

According to another aspect of the present disclosure, there is provide a glass article comprising a glass comprising a first surface, a second surface opposed to the first surface and side surfaces, wherein the glass comprises a first compressive region having a first compression depth from the first surface, a second compressive region having a second compression depth from the second surface, and a tensile region disposed between the first compressive region and the second compressive region, wherein the glass comprises glass bulk and a side low-refractive surface layer disposed on side surfaces of the glass bulk, and wherein a refractive index of the side low-refractive surface layer is smaller than a refractive index of the glass bulk and greater than a refractive index of air.

The details of one or more embodiments of the subject matter described in this specification are set forth in the accompanying drawings and the description below.

According to an exemplary embodiment of the present disclosure, a glass article can have a high strength which is not easily broken by an external impact. According to an exemplary embodiment of the present disclosure, a glass article having a high strength can be produced by an easy method.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
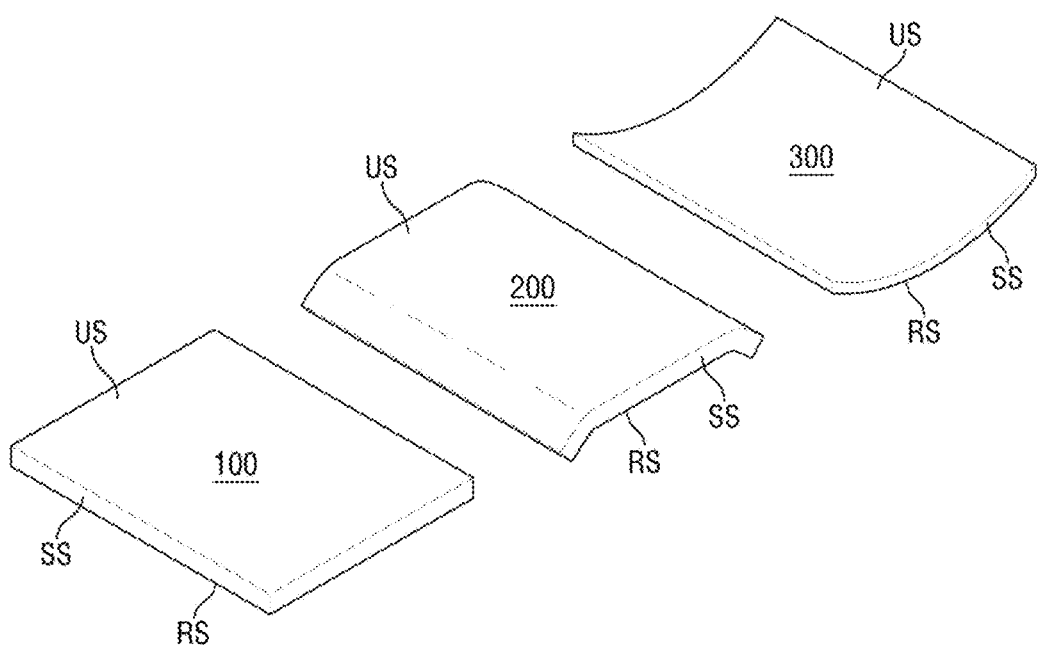
FIG. 1 is a perspective view of glass articles according to various exemplary embodiments.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined within the scope of the appended claims.

It will be understood that when an element or layer is referred to as being "on", "connected to" or "coupled to" another element or layer, it can be directly on, connected or coupled to the other element or layer or intervening elements or layers may be present. In the drawings, like reference numerals indicate like elements. As used herein, the term "and/or" includes any and all combinations of one or more of the associated listed items.

As used herein, "glass article" refers to an article that is entirely or partially made of glass.

Exemplary embodiments of the present disclosure will hereinafter be described with reference to the accompanying drawings.

The glass is used as a window for protecting a display, a substrate for a display panel, a substrate for a touch panel, an optical member such as a light guide plate, etc. in electronic devices including a display, such as a tablet PC, a notebook PC, a smart phone, an electronic book, a television and a PC monitor as well as a refrigerator and a cleaning machine including a display screen. Glass may also be employed as a cover glass for an instrument panel in a vehicle, a cover glass for solar cells, interior materials for construction materials, windows for buildings and houses, etc.

Some glass articles are required to have high strength. For example, when glass is employed as a window, it is desirable to have a small thickness and a high strength that is not easily broken by an external impact since it is required to have a high transmittance and a small weight. Glass having a high strength can be produced by, for example, chemical strengthening or thermal strengthening. Examples of strengthened glass are shown in FIG. 1.

FIG. 1 is a perspective view of glass articles according to various exemplary embodiments.

Referring to FIG. 1, in an exemplary embodiment, the glass article 100 may have the shape of a flat sheet or a flat plate. In another exemplary embodiment, the glass articles 200 and 300 may have a three-dimensional shape including bent portions. For example, the edge of the flat portion may be curved (e.g., the glass article 200) or the entire surface may be curved (e.g., the glass article 300). The shape of the glass articles 100, 200 and 300 may be, but is not limited to being, a rectangle when viewed from the top. For example, the glass articles 100, 200 and 300 may have various shapes such as a rounded rectangle, a square, a circle, and an ellipse. In the following description, a glass article having the shape of a rectangular flat plate will be described as an example of the glass article 100. It is, however, to be understood that the present disclosure is not limited thereto.

Figure 2:
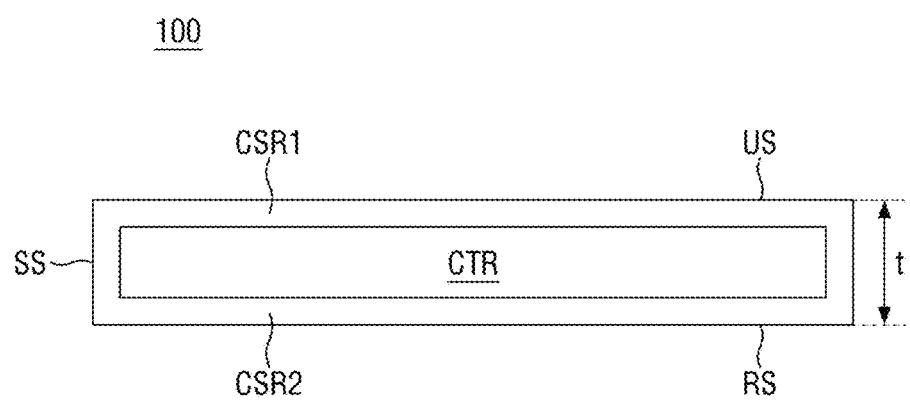
FIG. 2 is a cross-sectional view of a glass article having the shape of a flat plate according to an exemplary embodiment of the present disclosure.

FIG. 2 is a cross-sectional view of a glass article having the shape of a flat plate according to an exemplary embodiment of the present disclosure.

Referring to FIG. 2, the glass article 100 includes a plurality of surfaces US, RS and SS. The surface of the glass article may include a first surface US, a second surface RS and side surfaces SS. In the glass article 100 having the shape of a flat plate, the first surface US and the second surface RS are main surfaces having a large area (e.g., an upper surface and a lower surface), and side surfaces SS are outer surfaces connecting the first surface US with the second surface RS.

The first surface US and the second surface RS are opposed to each other in the thickness (t) direction. When the glass article 100 serves to transmit light like a window of a display, the light may be mainly incident on the first surface US or the second surface RS to exit through the other.

The thickness t of the glass article 100 is defined as the distance between the first surface US and the second surface RS. The thickness t of the glass article 100 may range, but is not limited to, from 0.1 to 2 mm. In an exemplary embodiment, the thickness t of the glass article 100 may be approximately 0.8 mm or less. In another exemplary embodiment, the thickness t of the glass article 100 may be approximately 0.65 mm or less. In yet another exemplary embodiment, the thickness t of the glass article 100 may be approximately 0.55 mm or less. In yet another exemplary embodiment, the thickness t of the glass article 100 may be approximately 0.5 mm or less. In yet another exemplary embodiment, the thickness t of the glass article 100 may be approximately 0.3 mm or less. Although the glass article 100 has the uniform thickness t, it may have different thicknesses for different regions.

The strengthened glass article 100 includes compressive regions CSR1 and CSR2 and a tensile region CTR. The compressive regions CSR1 and CSR2 refer to regions where compressive stress act, and the tensile region CTR refer to a region where tensile stress acts. The compressive regions CSR1 and CSR2 are disposed adjacent to the surfaces US, RS and SS of the glass article 100. The tensile region CTR is disposed in the inside (or center) of the glass article 100. The compressive regions may be disposed adjacent to the side surfaces SS as well as the first surface US and the second surface RS. The depths (compression depths) of the compressive regions CSR1 and CSR2 extending in the depth direction from each of the surfaces US, RS and SS may be, but is not limited to being, substantially uniform. The tensile region CTR may be surrounded by the compressive regions CSR1 and CSR2.

Figure 3:
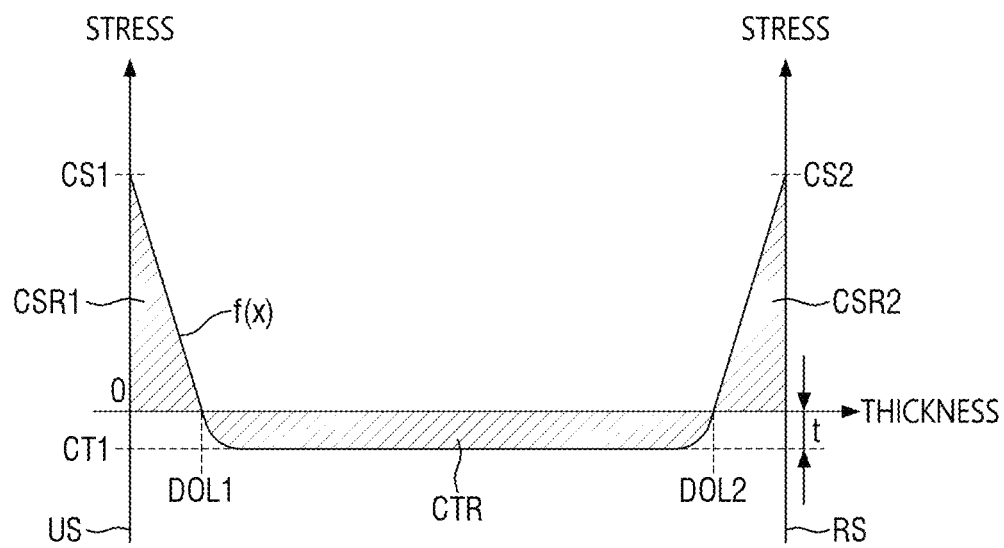
FIG. 3 is a graph showing the stress profile of a glass article according to an exemplary embodiment of the present disclosure.

FIG. 3 is a graph showing the stress profile of a glass article according to an exemplary embodiment of the present disclosure. In the graph of FIG. 3, the x-axis represents the thickness (t) direction of the glass article 100. In FIG. 3, the compressive stress has positive values, while the tensile stress has negative values. Herein, the magnitude of the compressive/tensile stress means the absolute value regardless of its sign.

Referring to FIGS. 2 and 3, the glass article 100 includes a first compressive region CSR1 that is extended from the first surface US to a first depth (a first compression depth DOL1), and a second compressive region CSR2 that is extended from the second surface RS to a second depth (a second compression depth DOL2). A tensile region CTR is disposed between the first compression depth DOL1 and the second compression depth DOL2. Although not shown in FIG. 3, a compressive region and a tensile region may be disposed between opposed side surfaces SS of the glass article 100 in a similar manner.

The first compressive region CSR1 and the second compressive region CSR2 are resistant to an external impact, thereby suppressing cracks in the glass article 100 or damage to the glass article 100. It can be said that the larger the maximum compression stresses CS1 and CS2 of the first and second compressive regions CSR1 and CSR2 are, the higher the strength of the glass article 100 is. Since an external impact is usually transmitted through the surfaces US, RS and SS of the glass article 100, it is advantageous to have the maximum compressive stresses CS1 and CS2 at the surfaces US, RS and SS of the glass article 100 in terms of durability. The maximum compressive stresses CS1 and CS2 of the first and second compressive regions CSR1 and CSR2 may be 700 MPa or more. For example, the maximum compressive stresses CS1 and CS2 of the first and second compressive regions CSR1 and CSR2 may be in the range of 800 MPa to 1,050 MPa. In an exemplary embodiment, the maximum compressive stresses CS1 and CS2 of the first and second compressive regions CSR1 and CSR2 may be in the range of 850 MPa to 1,000 MPa.

The first compression depth DOL1 and the second compression depth DOL2 suppress cracks or grooves formed in the first and second surfaces US and RS from propagating to the tensile region CTR inside the glass article 100. The larger the first and second compression depths DOL1 and DOL2 are, the better the propagation of cracks and the like can be prevented.

The first and second compression depths DOL1 and DOL2 may be in the range of 20 μm to 150 μm. In an exemplary embodiment, the first and second compression depths DOL1 and DOL2 may be in the range of 50 μm to 100 μm. In a particular exemplary embodiment, the first and second compression depths DOL1 and DOL2 may range from 70 to 85 μm.

In some exemplary embodiments, the first and second compression depths DOL1 and DOL2 may satisfy the following relationship with respect to the thickness t of the glass article 100, although not limited thereto:

$$DOL1, DOL2 \geq 0.1*t \qquad \text{[Mathematical Expression 1]}$$

In the exemplary embodiment of FIG. 3, the compressive stresses of the first compressive region CSR1 and the second compressive region CSR2 are the largest at the surfaces US and RS (see CS1 and CS2), respectively, and decrease toward the inside. Such stress profile may be obtained via an ion exchange process. The ion exchange process refers to a process of exchanging ions in the glass article 100 with other ions. By performing the ion exchange process, the ions at or near the surfaces US, RS, SS of the glass article 100 can be replaced or exchanged with larger ions having the same valence or oxidation state. For example, when the glass article 100 contains a monovalent alkali metal such as Li+, Na+, K+ and Rb+, the monovalent cation on the surface may be replaced by Na+, K+, Rb+, or Cs+ ions with larger ionic radius.

Figure 4:
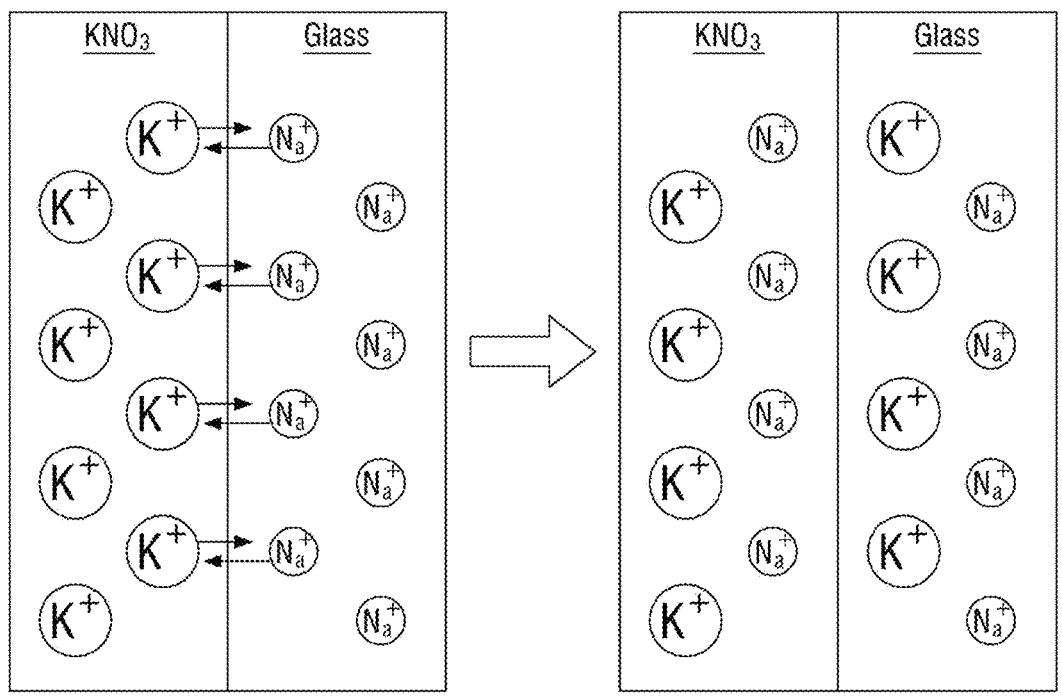
FIG. 4 is a schematic diagram illustrating an ion exchange process according to an exemplary embodiment of the present disclosure.

FIG. 4 is a schematic diagram illustrating an ion exchange process according to an exemplary embodiment of the present disclosure. FIG. 4 shows that sodium ions (Na+) inside the glass are exchanged with potassium ions (K+).

Referring to FIG. 4, when the glass containing sodium ions is exposed to potassium ions by, for example, immersing the glass in a molten salt bath containing potassium nitrate (KNOB), sodium ions in the glass are discharged to the outside and the potassium ions can replace them. The exchanged potassium ions generate compressive stress because they have larger ionic radius than sodium ions. The more potassium ions are exchanged, the greater the compressive stress becomes. Since the ion exchange takes place through the surface of the glass, the amount of potassium ions (i.e., density) on the glass surface is the greatest. Although some of the exchanged potassium ions may diffuse into the glass to increase the compression depth, the amount (density) may be generally reduced away from the surface. Thus, the glass may have the stress profile that has the greatest compressive stress on the surface and decreases toward the inside. However, the exemplary embodiments are not limited to the above examples. The stress profile may be modified depending on the temperature, time and the number of the ion exchange process, whether heat treatment is carried out, etc.

Referring again to FIGS. 2 and 3, the glass article 100 has a neutral stress (the stress value substantially equal to zero) at the first compression depth DOL1 and the second compression depth DOL2, and has tensile stress on the inner side. The tensile stress may be constant or increased toward the center.

The absolute value of the slope of the compressive stress in the stress profile may be greater than the absolute value of the slope of the tensile stress. On the inner side of the glass article 100, there may be a wide section exhibiting tensile stress and having the average slope of zero. The width of the section of the tensile region CTR in which the average slope is zero (i.e., the thickness of the glass article) may be, but is not limited to being, larger than the first and second compression depths DOL1 and DOL2.

The tensile stress in the tensile region CTR may balance the compression stresses of the first and second compressive regions CSR1 and CSR2. That is to say, in the glass article 100, the sum of the compressive stresses may be equal to the sum of tensile stresses. When the stress profile in the glass article 100 is represented by the function ƒ(x), the following relationship can be established:

$$\int_0^t f(x)dx = 0 \quad \text{[Mathematical Expression 2]}$$

For the glass article 100 in which the maximum compression stresses CS1 and CS2 and the compression depths DOL1 and DOL2 of the first compression region CSR1 and the second compression region CSR2 are equal to each other and their profiles approximate a triangular shape, and the profile of the tensile region CTR generally approximates a rectangular shape, the following relationship may be established:

$$CT1 = (CS1*DOL1)/(t-2*DOL1) \quad \text{[Mathematical Expression 3]}$$

where CT1 denotes the maximum tensile stress of the tensile region CTR, and CS1 denotes the maximum compressive stress of the first compressive region CSR1.

The larger the tensile stress inside the glass article 100 is, the more likely the fragments to be vigorously released when the glass article 100 is broken, and the more likely the glass article 100 is to be crushed from the inside. The maximum tensile stress that meets the frangibility requirements of the glass article 100 may satisfy the following relationship:

$$CT1 \leq -37.6*\ln(t) + 48.7 \quad \text{[Mathematical Expression 4]}$$

where CT1 is expressed in MPa, thickness t is expressed in mm, and ln(t) denotes the natural logarithm with respect to thickness t.

Although it is desired that the compressive stresses CS1 and CS2 and the compression depths DOL1 and DOL2 have large values in order to increase the strength of the glass article 100, the tensile stress is also increased with the sum of the compressive stresses. In order to meet the frangibility requirements while having a high strength, it is desired to adjust the stress profile such that the maximum compressive stresses CS1 and CS2 and the compression depths DOL1 and DOL2 have large values while the sum of the compressive stresses (e.g., the area of the compressive regions in FIG. 3) becomes smaller. The stress profile in the glass article 100 can be controlled by an ion exchange process, a heat treatment process, a post-treatment process, or the like. Detailed descriptions on this will be given later on.

According to some exemplary embodiments of the present disclosure, the maximum tensile stress CT1 of the glass article 100 can satisfy the condition of Equation 4 above within the range defined by Equation 5 below:

$$-37.6*\ln(t) + 10 \leq CT1 \leq -37.6*\ln(t) + 48 \quad \text{[Mathematical Expression 5]}$$

According to an exemplary embodiment of the present disclosure, the glass article 100 may have no low-refractive surface layer on the first surface US and the second surface RS or may have a low-refractive surface layer having a very small thickness (e.g., less than 100 nm). This is in contrast to glass having a low-refractive surface layer with a thickness of 100 nm to 500 nm on the surface via an ion exchange process. The glass article 100 according to the exemplary embodiment of the present disclosure may be produced by preparing a strengthened glass including a low-refractive surface layer and removing all or a part of the low-refractive surface layer. Removing the low-refractive surface layer may be carried out by etching or polishing. More detailed description thereon will be given below with respect to the following exemplary embodiments.

Figure 5:
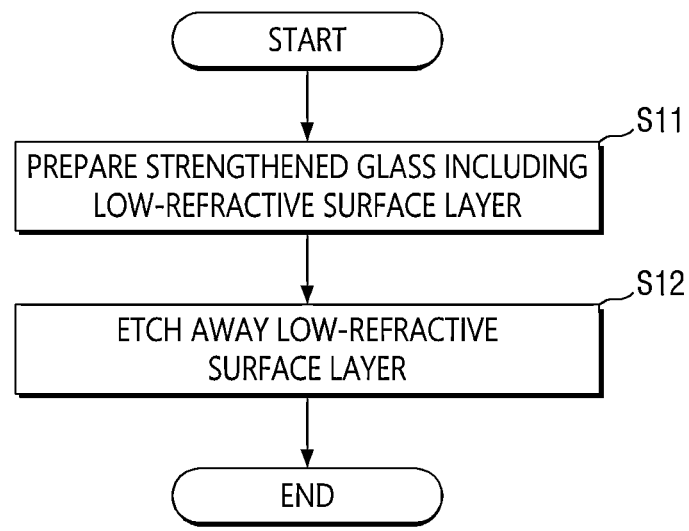
FIG. 5 is a flowchart for illustrating a method for producing a glass article according to an exemplary embodiment of the present disclosure.

FIG. 5 is a flowchart for illustrating a method for producing a glass article according to an exemplary embodiment of the present disclosure.

Referring to FIG. 5, according to an exemplary embodiment of the present disclosure, a method for producing a glass article includes preparing a strengthened glass including a low-refractive surface layer (step S11), and etching away the low-refractive surface layer (step S12).

Figure 6:
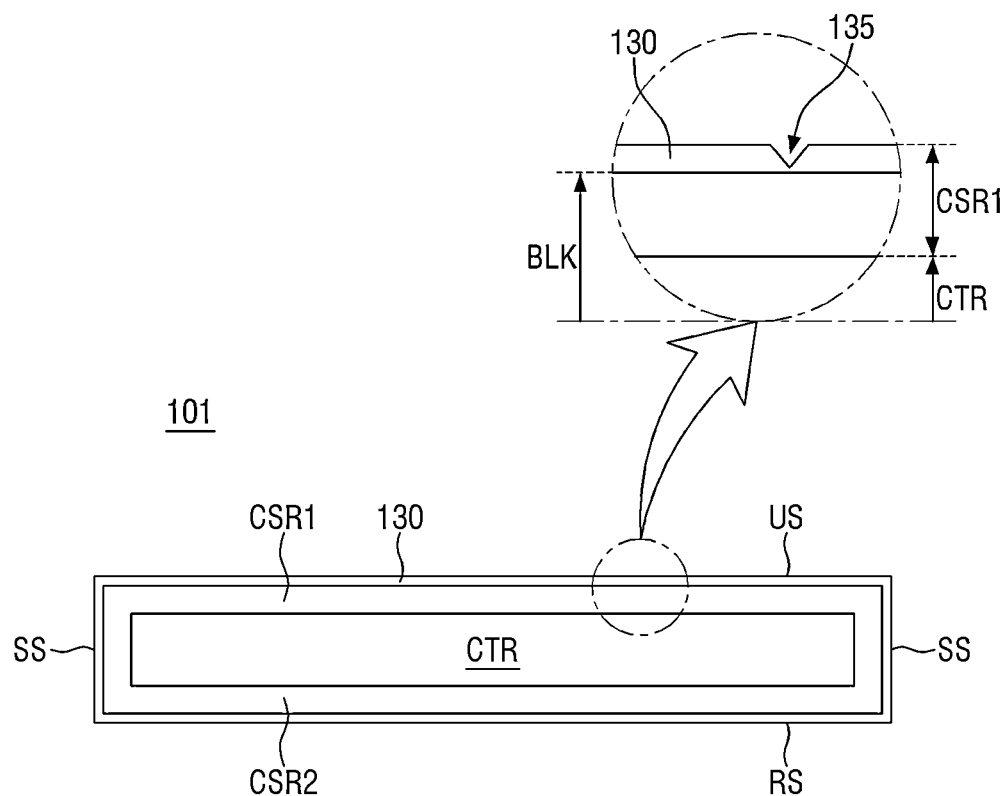
FIG. 6 is a cross-sectional view of a strengthened glass including a low refractive surface layer.

FIG. 6 is a cross-sectional view of a strengthened glass including a low-refractive surface layer.

Referring to FIG. 6, the strengthened glass 101 may be obtained via an ion exchange process. A method for producing the strengthened glass 101 will be described in detail later.

The ion exchange process can introduce compressive stress in the vicinity of the surface of the glass while forming a low-refractive surface layer 130 on the surface. The low-refractive surface layer 130 may be formed on all surfaces (the first surface US, the second surface RS, and the side surfaces SS) of the strengthened glass 101. The low-refractive surface layer 130 is located on the surfaces US, RS and SS of the strengthened glass 101 in the compressive regions CSR1 and CSR2. The low-refractive surface layer 130 has a thickness less than the compression depth. The thickness of the low-refractive surface layer 130 may range from 100 nm to 500 nm. The compressive regions CSR1 and CSR2 may have the maximum compressive stress at the surface of the low-refractive surface layer 130.

The low-refractive surface layer 130 may not be distinguished by naked eyes from the bulk BLK of the strengthened glass 101 (the portion of the strengthened glass except the low-refractive surface layer). That is to say, unlike typical layer structures, the bulk BLK of the strengthened glass 101 may not be distinguished from the low-refractive surface layer 130 by naked eyes. However, the low-refractive surface layer 130 may be distinguishable from the bulk BLK of the strengthened glass 101 by an optical method, by compositions thereof, or the like.

The low-refractive surface layer 130 has a lower refractive index than the refractive index of the bulk BLK of the strengthened glass 101. The refractive index of the low-refractive surface layer 130 is larger than the refractive index of air and smaller than the refractive index of the bulk BLK of the strengthened glass 101. When the refractive index of the bulk BLK of the strengthened glass 101 is 1.5, the refractive index or the average refractive index of the low-refractive surface layer 130 may be equal to 1.48 or less, equal to 1.45 or less, and in some exemplary embodiments equal to 1.3 or less. The low-refractive surface layer 130 may form an optical interface with the bulk BLK of the strengthened glass.

The low-refractive surface layer 130 may include fine pores or fine grooves therein. The fine pores or fine grooves may be filled with the air to lower the average refractive index of the low-refractive surface layer 130.

The low-refractive surface layer 130 may be a silicon rich layer. The low-refractive surface layer 130 may have a silicon content higher than that of the bulk BLK of the strengthened glass 101. The silicon content of the low-refractive surface layer 130 is higher because the alkali metal or alkaline earth metal is removed during a high-temperature salt treatment process for ion exchange of the strengthened glass 101. In an exemplary embodiment, the ratio of the silicon content of the low-refractive surface layer 130 to the silicon content of the bulk BLK of the strengthened glass 101 may be, but is not limited to, 1.2 to 1.4.

The low-refractive surface layer 130 may be a sodium poor layer. Since the low-refractive surface layer 130 is located on the surfaces US, RS and SS of the strengthened glass 101, the sodium may be largely discharged through the ion exchange, such that the sodium content of the low-refractive surface layer 130 may be significantly smaller that the sodium content of the bulk BLK of the strengthened glass 101.

The low-refractive surface layer 130 may include a fine crack 135. The fine crack 135 may be formed by a small friction, impact, or reaction with moisture in the air during the process of producing glass. The fine crack 135 may be generated during a process of strengthening the glass and may become larger under high temperature conditions of the strengthening process.

The low-refractive surface layer 130 is located at the outermost side of the strengthened glass 101 and may include defects such as the fine crack 135. Such defects on the surface may lower the strength of the strengthened glass 101.

Accordingly, according to an exemplary embodiment of the present disclosure, the method for producing glass article includes etching and removing the low-refractive surface layer 130 of the strengthened glass 101 which is to be processed. By removing the low-refractive surface layer 130, it is possible to improve the transmittance of the glass article 100 (see FIG. 2), and overcome defects on the surface. As the low-refractive surface layer 130 is removed, the thickness of the glass article 100 (see FIG. 2) may be somewhat reduced.

Figure 7:
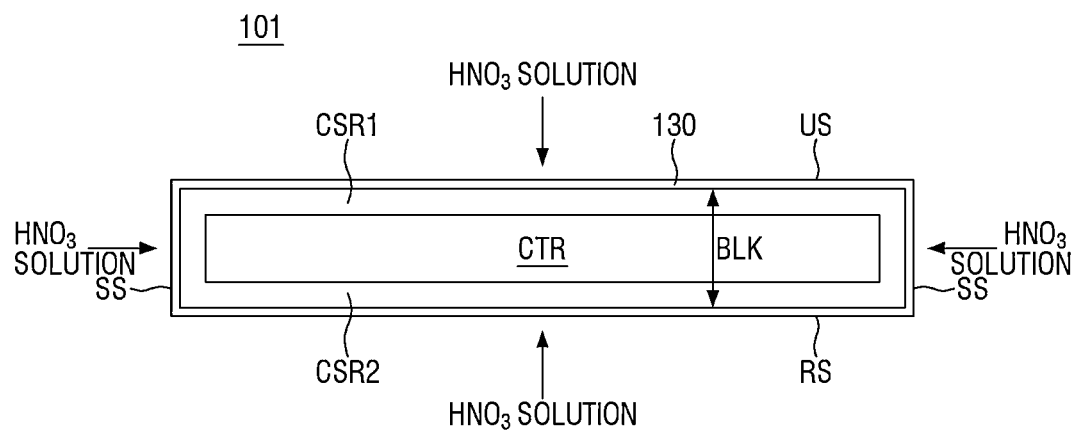
FIG. 7 is a cross-sectional view showing an acid cleaning process of the strengthened glass.
Figure 8:
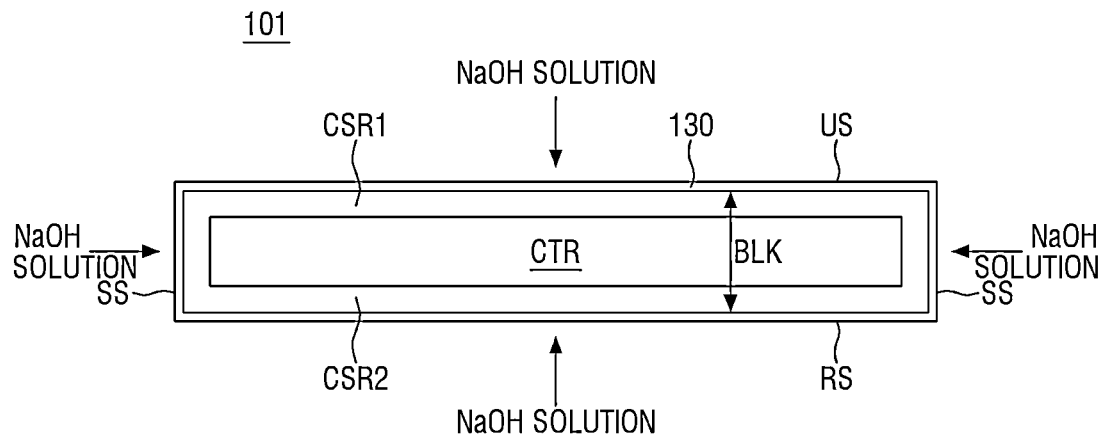
FIG. 8 is a cross-sectional view showing a base cleaning process of strengthened glass.

The etching the low-refractive surface layer 130 may include an acid cleaning process and a base cleaning process. The acid cleaning process may be carried out using an acidic solution containing at least one of: inorganic acids such as hydrochloric acid, sulfuric acid, nitric acid and hydrogen fluoride; and organic acids such as formic acid, oxalic acid, citric acid, acetic acid, and benzoic acid. The base cleaning process may be carried out using a base solution containing at least one of: hydroxides of alkali metals such as sodium hydroxide, potassium hydroxide and lithium hydroxide; hydroxides of alkaline earth metal such as calcium hydroxide; inorganic alkali metal salts such as sodium carbonate; organic alkali metal salts such as sodium acetate, and ammonia water. FIGS. 7 and 8 illustrate an acid cleaning process using an acidic solution containing nitric acid, and a base cleaning process using a basic solution containing sodium hydroxide, respectively.

FIG. 7 is a cross-sectional view showing an acid cleaning process of the strengthened glass.

Referring to FIG. 7, the strengthened glass 101 including the low-refractive surface layer 130 is cleaned with an acidic solution containing nitric acid ($HNO_3$). Although the acid cleaning process may be carried out by immersing the strengthened glass 101 into an acidic solution to stir it, it may also be carried out by spraying or other methods.

The content of nitric acid in the acid solution may be, e.g., approximately 6 wt % or less, e.g., approximately 2 wt % to 5 wt %. The pH of the acidic solution may range from 1 to 3. The acid cleaning process may be carried out at a temperature of 30° C. to 50° C. for 0.5 to 5 minutes or 2 to 4 minutes.

Even after the above-described acid cleaning process has been completed, the low-refractive surface layer 130 is hardly removed.

FIG. 8 is a cross-sectional view showing a base cleaning process of strengthened glass.

After the acid cleaning process, the strengthened glass 101 is cleaned with a basic solution containing sodium hydroxide (NaOH). Although the base cleaning process may be carried out by immersing the strengthened glass 101 into a base solution to stir it, it may also be carried out by spraying or other methods.

The content of sodium hydroxide in the base solution may be, e.g., approximately 6 wt % or less, e.g., approximately 2 wt % to 5 wt %. The pH of the base solution may range from 12 to 14. The base cleaning process may be carried out at a temperature of 30° C. to 50° C. for 0.5 to 5 minutes or 2 to 4 minutes.

After the base cleaning process has been completed, the surface of the strengthened glass 101 may be etched to a depth of approximately 500 nm, such that the low-refractive surface layer 130 may be removed. The fine crack 135 formed on the surface can also be removed together with the low-refractive surface layer 130. After the low-refractive surface layer 130 has been completely removed, a glass article as shown in FIG. 2 can be obtained. The glass article 100 of FIG. 2 may have no optical interface throughout the glass article 100 when compared to the strengthened glass 101 of FIG. 6. In addition, defects on the surface are overcome and the strength is improved as the low-refractive surface layer 130 has been removed.

In some implementations, a part of the low-refractive surface layer 130 may remain, in which case the thickness of the low-refractive surface layer 130 is still reduced. Since the fine crack 135 penetrate in the depth direction from the surface, such a fine crack may be removed or reduced if the low-refractive surface layer 130 is removed in the depth direction from the surface by the etching process. Accordingly, even if the low-refractive surface layer 130 remains at a small thickness of less than 100 nm, the strength of the glass article 100 can be enhanced by the etching process.

As described above, the low-refractive surface layer 130 is removed mainly by the base cleaning process. However, when the base cleaning process alone is performed without the acid cleaning process, the low-refractive surface layer 130 is not efficiently etched away. It is believed that the acid cleaning process itself does not remove the low-refractive surface layer 130 but serves to transform the low-refractive surface layer 130 into a state that can be easily removed by the base cleaning process. For the same reason, it is preferable to carry out the acid cleaning process first and then the basic cleaning process.

The etching process including the acid cleaning and base cleaning processes mainly etches the low-refractive surface layer 130. In an exemplary embodiment, the etch rate of the bulk BLK of the strengthened glass 101 with respect to the cleaning solution is lower than the etch rate of the low-refractive surface layer 130. After the low-refractive surface layer 130 has been completely removed, the surface of the bulk BLK of the strengthened glass may be exposed to the cleaning solution depending on the concentration of the cleaning solution, time, temperature, etc. However, if the etch rate of the bulk BLK of the strengthened glass is low, it is possible to prevent the bulk BLK from being overly etched.

When the surface of the strengthened glass 101 is etched, the stress profile inside it may change as well.

Figure 9:
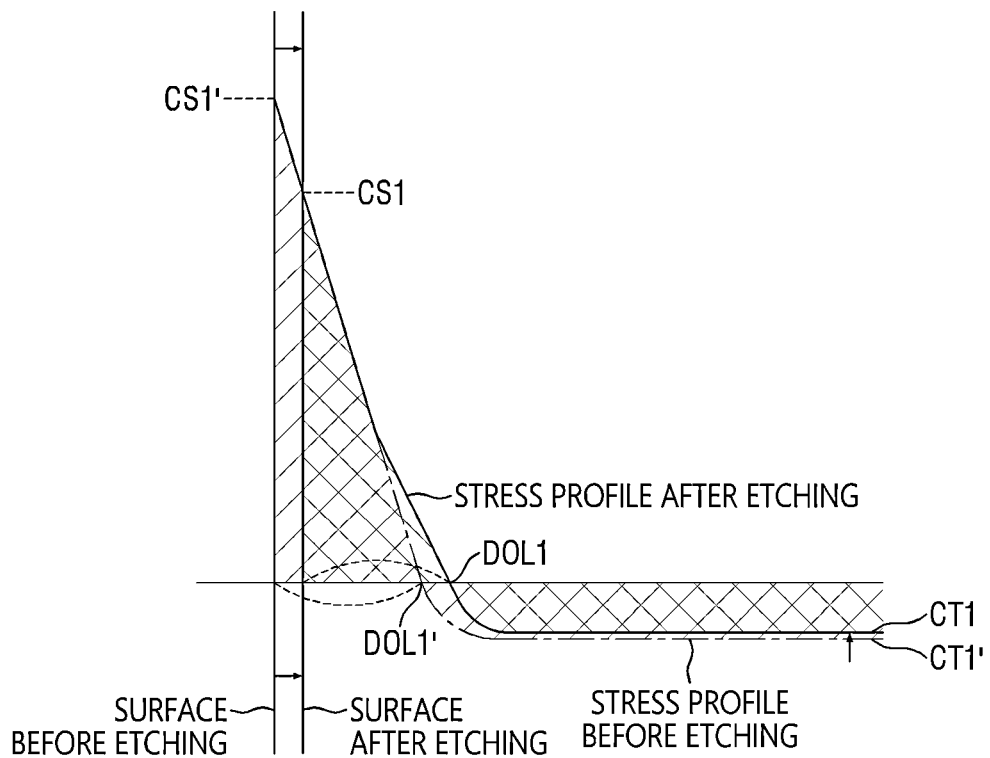
FIG. 9 is a graph showing the stress profile before and after the etching process.

FIG. 9 is a graph showing the stress profile before and after the etching process. For convenience of illustration, the stress profile is simplified in FIG. 9.

Referring to FIG. 9, the strengthened glass has the maximum compressive stress CS1' at the surface before the etching. The maximum compressive stress also changes as the surface of the strengthened glass is removed by the etching process. As mentioned earlier, the compressive stress is proportional to the density of the exchanged ions. During the etching process, no ion is supplied newly, and the heat energy for diffusing ions is not so large. Thus, the position of the exchanged ions hardly changes. Therefore, the compressive stress at the surface can be maintained as the original profile, except the portion removed by the etching. If the original profile had a shape that decreased with thickness (depth), it would have the maximum compressive stress CS at the surface of the glass article even after the etching.

Since the surface of the strengthened glass having the maximum compressive stress CS1' before the etching is removed by the etching, the maximum compressive stress CS1 after the etching is lower than the maximum compressive stress CS1' before the etching. Although the thickness removed by the etching is merely a very small fraction of the compression depth, the reduction rate of the maximum compressive stress may vary depending on the slope of the compressive stress profile. If the slope of the compressive stress profile CS1' near the surface is steep, the maximum compressive stress CS1 may be significantly reduced even if a small thickness of the surface has been etched away.

In an exemplary embodiment, the reduction rate of the maximum compressive stress by the etching (((CS1'−CS1)/CS1') may be equal to or less than 10%. The reduction in the maximum compressive stress (CS1'-CS1) by the etching may range from 10 MPa to 100 MPa. For example, the reduction (CS1'-CS1) may be in the range of 50 MPa to 100 MPa, or in the range of approximately 60 MPa to 70 MPa.

As the maximum compressive stress CS1 decreases after the etching, the sum of the compressive stresses of the compressive regions can also be reduced. Accordingly, the sum of the tensile stresses of the tensile regions can also be reduced to satisfy Equation 2 above. As the sum of tensile stresses changes, the stress profile in the tensile region changes, and the neutral stress point also changes. As can be seen from results of the experiments, the first compression depth DOL1' before the etching is substantially the same as the first compression depth DOL1 after the etching, without any significant change. This means that the neutral stress point has moved to the inside of the strengthened glass.

The maximum tensile stress can also be reduced as the sum of the tensile stresses is reduced by the etching. The present disclosure, however, is not limited thereto. The maximum tensile stress may be maintained if it is possible to compensate for the reduced stress only by a change in the neutral stress point and/or a change in the slope of the tensile stress profile.

In an exemplary embodiment where the maximum tensile stress is reduced by the etching, the frangibility requirements of the glass article of Equation 4 above is applied to the glass article after the etching. The strengthened glass before the etching, which is not a complete article yet, may not necessary have to meet the requirements. In view of the above, according to some exemplary embodiments of the present disclosure, the strengthened glass before the etching and the glass article after the etching may satisfy the following relationship:

$$CT1' > -37.6 * \ln(t') + 48.7, CT1 \leq -37.6 * \ln(t) + 48.7 \quad \text{[Mathematical Expression 6]}$$

where CT1' denotes the maximum tensile stress before the etching, t' denotes the thickness of the strengthened glass, CT1 denotes the maximum tensile stress after the etching, and t denotes the thickness of the glass article.

According to Equation 6 above, the strengthened glass can be produced under conditions exceeding the frangibility requirements according to Equation 4, and the tensile stresses can be adjusted to satisfy Equation 4 by the etching. The present disclosure, however, is not limited thereto. The maximum tensile stresses CT1' and CT1 of the strengthened glass before as well as after the etching may satisfy Equation 4.

Figure 10:
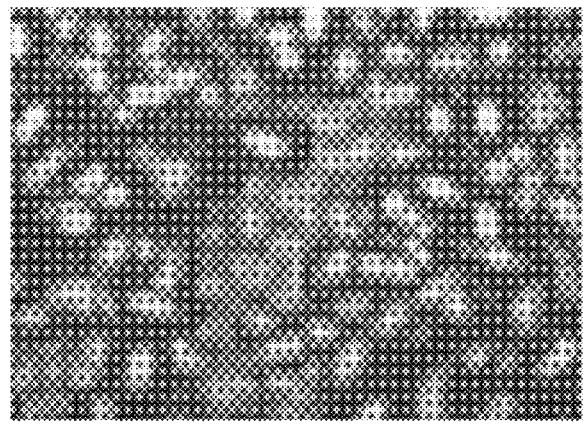
FIGS. 10 and 11 are images when viewed from the top for comparing the surfaces of the glass articles according to the etching techniques.
Figure 11:
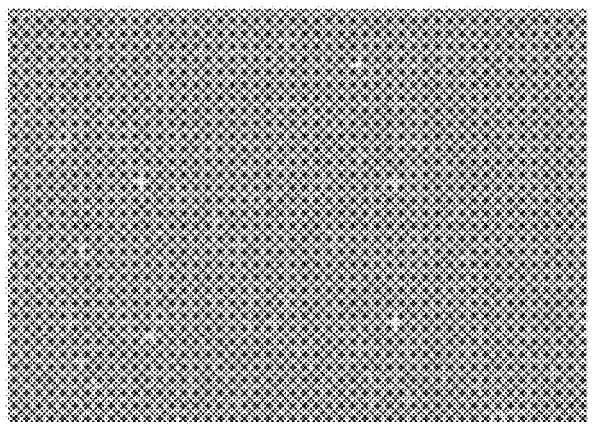

FIGS. 10 and 11 are images when viewed from the top for comparing the surfaces of the glass articles according to the etching techniques. FIG. 10 is an image of a glass article obtained by performing an etching process on a strengthened glass with hydrofluoric acid (HF), taken by a scanning electron microscope (SEM). FIG. 11 is an image of a glass article obtained by performing an etching process on the strengthened glass according to the exemplary embodiments of FIGS. 7 and 11, taken by a scanning electron microscope (SEM).

Hydrofluoric acid (HF) can also be effectively used to remove fine cracks on the surface of the strengthened glass. For example, a fine crack can be removed by processing the surface of the strengthened glass with hydrofluoric acid (HF), and polishing or etching away the periphery of the fine crack so that a gentle recess is formed around the fine crack. However, since the etching with hydrofluoric acid (HF) leaves recesses in the shape of rice grains on the surface of the glass article as shown in FIG. 10, the optical characteristics are degraded and the recesses can be seen by a user.

In contrast, if the etching is carried out with an acid solution containing nitric acid and a basic solution containing sodium hydroxide, fine cracks can be removed without leaving recesses in the shape of rice grains on the surface of the glass article, to provide a substantially flat surface as shown in FIG. 11.

Hereinafter, a method for producing strengthened glass will be described, which is prepared before the etching process of the low-refractive surface layer.

Initially, the glass is prepared, which is not strengthened yet. The glass before it is strengthened may be produced by various techniques such as a floating method, a fusion method, and a slot down-draw method. The glass before it is strengthened may be an alkali aluminosilicate glass or the like. The compositions of the glass before it is strengthened may include $SiO_2$ and $Al_2O_3$. The compositions of the glass before it is strengthened may further include $Na_2O$. The compositions of the glass before it is strengthened may include at least one of $K_2O$, $B_2O_3$, $Li_2O$, MgO, CaO, ZnO, $ZrO_2$, $Fe_2O_3$, $SnO_2$ and $P_2O_5$. In some exemplary embodiments, the glass before it is strengthened may contain substantially no $Li_2O$ and $P_2O_5$. In some exemplary embodiments, the glass before it is strengthened may contain substantially no $Li_2O$, $P_2O_5$ and $B_2O_3$. According to the exemplary embodiment, even if the glass article contains no $Li_2O$, $P_2O_5$ and/or $B_2O_3$, it can have a compressive stress of 700 MPa or higher via the strengthening process and the process of removing the low-refractive surface layer and can have a sufficient depth for satisfying Equation 1 above.

Subsequently, the glass is strengthened. The glass may be strengthened by a first ion exchange process and a second ion exchange process.

The first ion exchange process may include exposing the glass to a molten salt containing potassium ions (K+). The molten salt may be, for example, a salt mixed with sodium nitrate (NaNO3) and potassium nitrate (KNOB). The first ion exchange process may be carried out at a temperature of ±20° C., which is lower than the strain point by 50° C. For example, if the strain point of the glass is approximately 580° C., the first ion exchange process may be carried out at a temperature of approximately 500° C. or higher (e.g., 530° C.). The time for which the first ion exchange process is carried out may range, but is not limited to, 3 hours to 8 hours (e.g., approximately 5 hours). Through the first ion exchange process, potassium ions may enter the glass to introduce compressive stress near the surface of the glass.

After the first ion exchange process, a stress-relieving process may be further carried out. The stress-relieving process may be carried out at a temperature of approximately 500° C. or higher (e.g., approximately 530° C.) for 1 to 3 hours (e.g., approximately 2 hours). Via the stress-relieving process, the maximum compressive stress may be reduced, and the potassium ions diffuse into the inside and the compression depth may be increased. The stress-relieving process may be carried out in air or in liquid. The stress-relieving process may be carried out in a liquid by immersing it into in a salt mixture of potassium ions and sodium ions to perform heat treatment. The stress-relieving process may be eliminated.

After the stress-relieving process, the second ion exchange process is carried out. The second ion exchange process may be carried out by exposing the glass to a molten single salt containing potassium ions. The second ion exchange process may be carried out at a lower temperature and for a shorter time than the first ion exchange process. For example, the second ion exchange process may be carried out at a temperature from 380° C. to 460° C. (e.g., approximately 420° C.) for 1 to 3 hours or 1.3 to 2 hours.

After the second ion exchange process is carried out, the compressive stress can be increased greatly at a shallow position of the surface of the glass.

After the first ion exchange process, the stress-relieving process and second ion exchange process, the glass article may have a high surface compressive stresses and a sufficient compression depth. The compressive stress profile may have a steep slope near the surface of the glass article, and may have a slope becoming gentler toward the inside of the glass article. For example, the compressive stress profile may include a first section having the average slope (absolute value) of 40 MPa/μm to 200 MPa/μm from the surface to a first point, and a second section more distant from the surface than the first section and having the average slope (absolute value) equal to or less than 2 MPa/μm. Both the first section and the second section may lie within the compressive region. The first section may be extended from the surface to a depth exceeding 15 μm. In some exemplary embodiments, the compressive stress profile may include a point in the compressive region at which the average slope is 0 MPa/μm.

Figure 12:
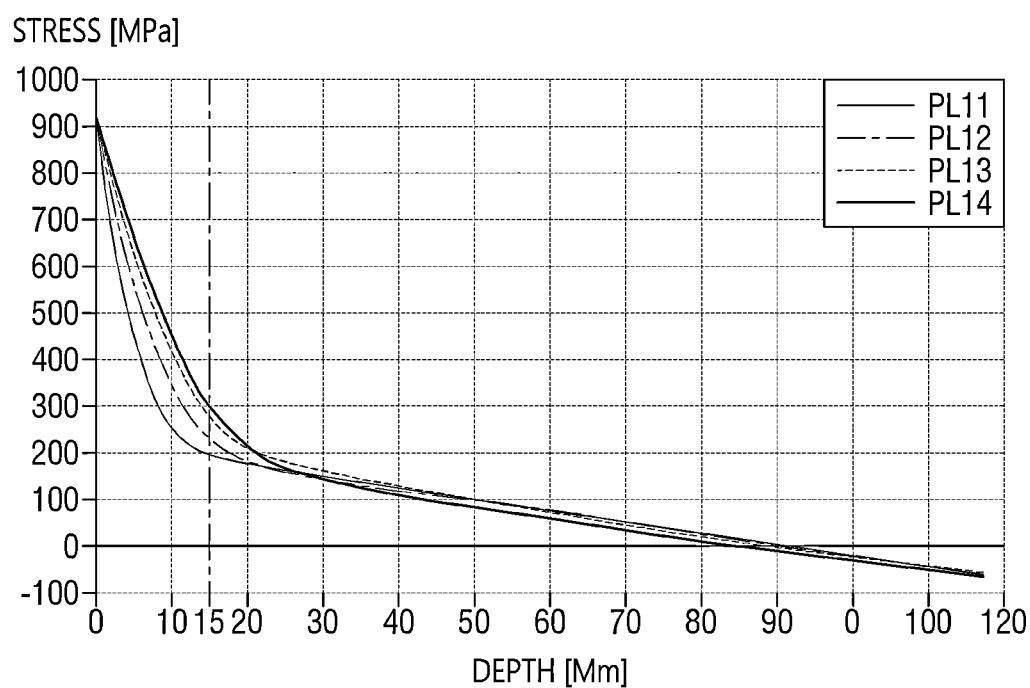
FIGS. 12 and 13 are graphs illustrating the stress profiles of the glass after being subjected to the second ion exchange process according to various exemplary embodiments.
Figure 13:
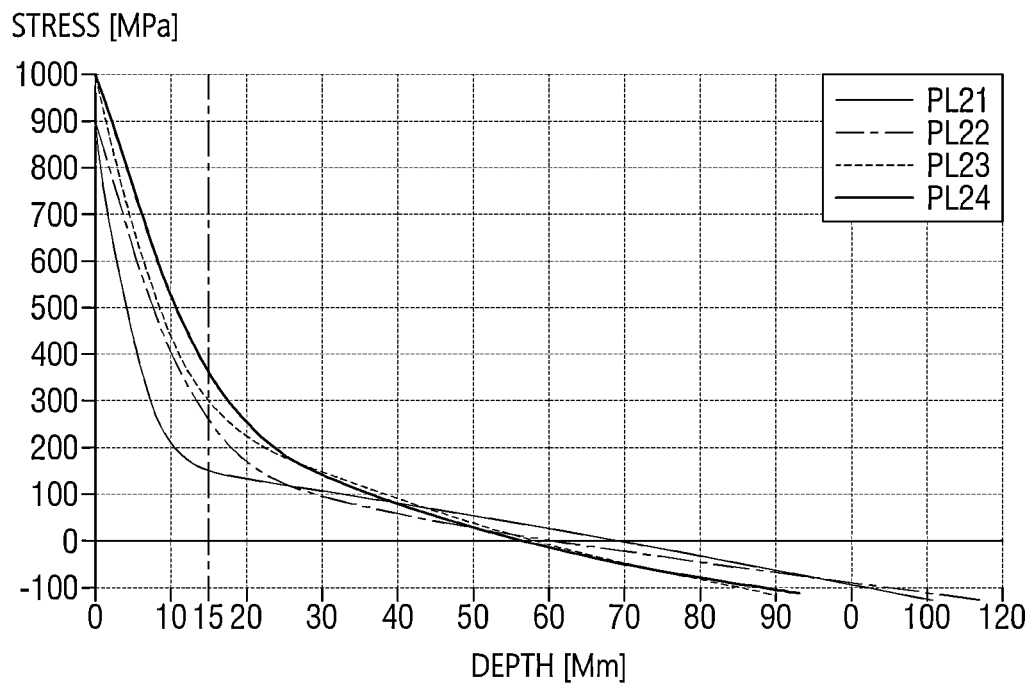

FIGS. 12 and 13 are graphs illustrating the stress profiles of the glass after being subjected to the second ion exchange process according to various exemplary embodiments.

In the graph shown in FIG. 12, a first curve PL11 represents the stress profile of the glass that was subjected to the first ion exchange process and then the second ion exchange process for approximately 30 minutes. A second curve PL12 represents the stress profile of the glass that was subjected to the first ion exchange process and then the second ion exchange process for approximately 60 minutes. A third curve PL13 represents the stress profile of the glass that was subjected to the first ion exchange process and then the second ion exchange process for approximately 90 minutes. A fourth curve PL14 represents the stress profile of the glass that was subjected to the first ion exchange process and then the second ion exchange process for approximately 120 minutes. Referring to FIG. 12, it can be seen that the transition points, at which the slopes change sharply, vary depending on the period of time in which the second ion exchange process is carried out. In the graph shown in FIG. 12, the transition points of the first to fourth curves PL11 to PL14 are 9 μm, 12 μm, 15 μm and 17 μm, respectively. Accordingly, the depths of the transition points tend to increase as the period of time of the second ion exchange process increases.

In the graph shown in FIG. 13, a fifth curve PL21 represents the stress profile of the glass that was subjected to the first ion exchange process, a stress-relieving process and then the second strengthening process for approximately 30 minutes. A sixth curve PL22 represents the stress profile of the glass that was subjected to the first ion exchange process, the stress-relieving process and then the second strengthening process for approximately 120 minutes. A seventh curve PL23 represents the stress profile of the glass that was subjected to the first ion exchange process, and then the second strengthening process for approximately 60 minutes, without the stress-relieving process. An eighth curve PL24 represents the stress profile of the glass that was subjected to the first ion exchange process, and then the second strengthening process for approximately 90 minutes, without the stress-relieving process.

Referring to FIG. 13, it can be seen that the transition points can be controlled also by adding the stress-relieving process. Specifically, as can be seen from the fifth curve PL21 and the sixth curve PL22, even if the stress-relieving process is further carried out, the positions of the transition points can be changed by controlling the duration of the second strengthening process. Further, as indicated by the seventh curve PL23 and the eighth curve PL24, the positions of the transition points can be easily controlled by controlling the period of time the second strengthening step even if the stress-relieving process is not further performed.

A more detailed description and various embodiments of the above-mentioned method for producing strengthened glass are disclosed in Korean Patent Application No. 10-2017-0048080 filed by the applicant on Apr. 13, 2017, the entirety of which is incorporated herein by reference.

Figure 14:
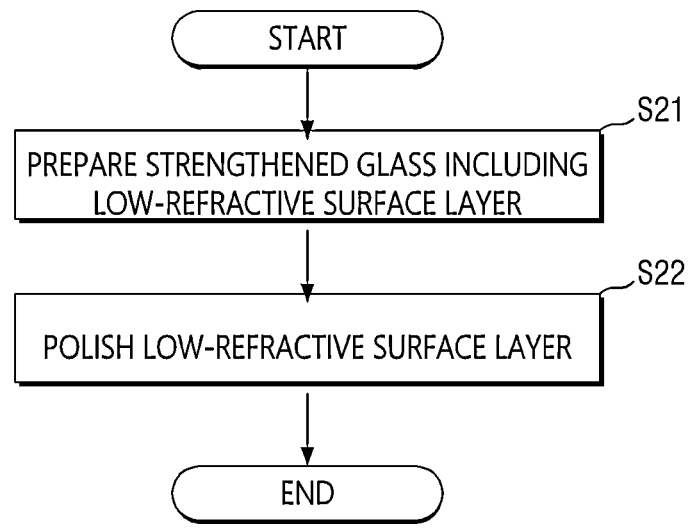
FIG. 14 is a flowchart for illustrating a method for producing a glass article according to another exemplary embodiment of the present disclosure.

FIG. 14 is a flowchart for illustrating a method for producing a glass article according to another exemplary embodiment of the present disclosure.

Referring to FIG. 14, according to the exemplary embodiment of the present disclosure, a method for producing a glass article includes preparing a strengthened glass including a low-refractive surface layer (step S21), and polishing the low-refractive surface layer (step S22).

The preparing the strengthened glass including the low-refractive surface layer (step S21) is identical to that of the exemplary embodiments of FIGS. 5 and 6; and, therefore, the redundant description will be omitted.

Subsequently, the low-refractive surface layer is polished (step S22).

Figure 15:
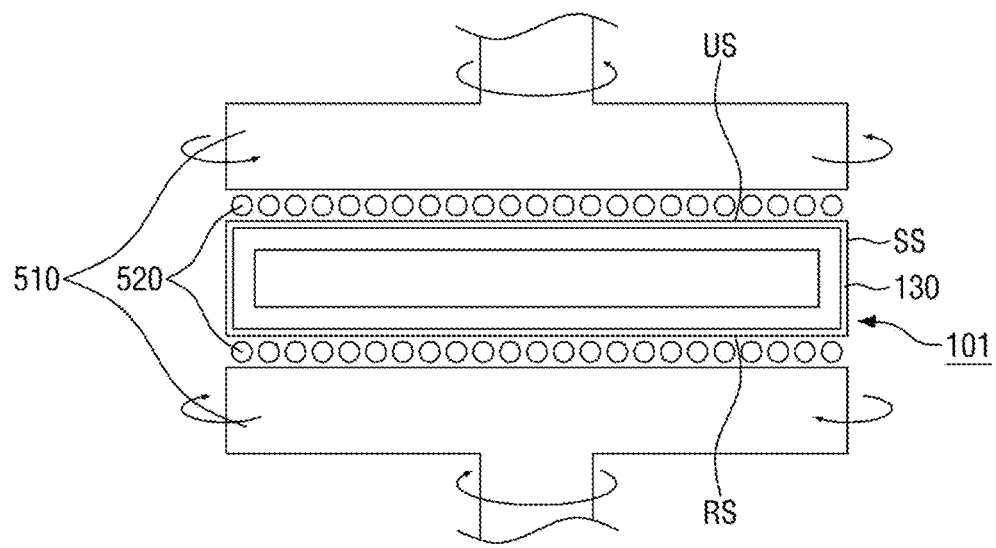
FIG. 15 is a cross-sectional view showing a polishing process of the strengthened glass.

FIG. 15 is a cross-sectional view showing a polishing process of the strengthened glass.

Referring to FIG. 15, the polishing process may be carried out by a chemical mechanical polishing method. Specifically, the first surface US and the second surface RS of the strengthened glass 130 to be processed are polished using a chemical mechanical polishing apparatus 510 and a polishing slurry 520. Although it is shown that the first surface US and the second surface RS are polished simultaneously, the first surface US and the second surface RS may be polished sequentially as well. For example, the strengthened glass 101 may be placed such that the second surface RS faces the stage (not shown) of the chemical mechanical polishing apparatus 510, the first surface US exposed upward is polished, and then the strengthened glass 101 is turned over such that the second surface RS is polished. According to another exemplary embodiment of the present disclosure, the first surface US or the second surface RS may be subjected to the polishing process.

The polishing thickness may be adjusted, for example, in the range of 100 nm to 1,000 nm (e.g., approximately 500 nm). The first and second surfaces may be polished to the same depth or different depths.

Figure 16:
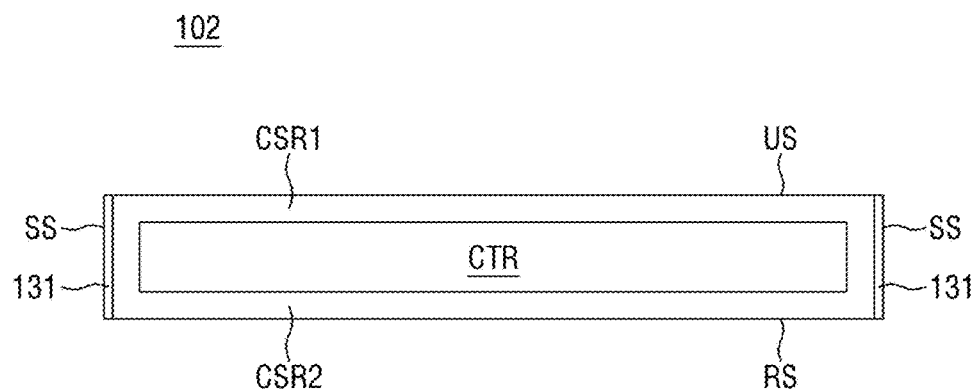
FIG. 16 is an image showing a cross section of the glass article after the polishing process has been completed.

FIG. 16 is an image showing a cross section of the glass article after the polishing process has been completed.

Referring to FIG. 16, the first surface US and the second surface RS of the glass article 102 are removed by polishing the low-refractive surface layer, but the side surfaces SS are not removed in doing so, such that the low-refractive surface layer 131 may remain on the side surfaces SS. Specifically, a first surface US and a second surface RS of a glass article 102 are identical to those of the glass article shown in FIG. 2. However, side surfaces SS are different in that the side surfaces SS include the low-refractive surface layer 131. By removing the low-refractive surface layer from the first surface US and the second surface RS, no optical interface is formed in the thickness direction section from the first surface US to the second surface RS, so that the refractive index can be kept constant. The thickness of the low-refractive surface layer 131 remaining on the side surfaces SS may range from 100 nm to 500 nm. Even after the polishing process, some portion of the low-refractive surface layer may remain on the first surface US or the second surface RS. The thickness of the low-refractive surface layer remaining on the first surface US or the second surface RS may be smaller than the thickness of the low-refractive surface layer 131 remaining on the side surfaces SS.

As the low-refractive surface layer 131 remains on the side surfaces SS of the glass article 102, there may be fine cracks or variations in optical characteristics. However, unlike the first surface US or the second surface RS, the side surfaces SS of the glass article 102 do not contribute greatly to light transmission. Therefore, the fine cracks on the side surfaces SS have little effect on the overall strength of the glass article 102. Therefore, the glass article 102 of FIG. 16 can also have the optical characteristics and strength comparable to those of the exemplary embodiment of FIG. 2.

The polishing process according to the exemplary embodiment of the present disclosure can also be utilized to achieve the uniform compressive stress characteristics at the first surface and the second surface of the glass article.

For example, the floating method, which is one of the techniques for producing a glass plate, is carried out by flowing glass compositions into a tin bath. In doing so, the surface of the glass plate in contact with the bath may have different compositions from the surface not in contact with the bath. As a result, after the process of strengthening the glass, there may be deviations in the compressive stress of approximately 40 MPa between the surface in contact with the tin bath (e.g., the first surface) and the surface not in contact with the tin bath (e.g., the second surface). In this regard, by removing the surface of the glass to an appropriate thickness by polishing, it is possible to reduce the deviations in the compressive stresses between the surfaces. For example, it is possible to reduce the deviations in the compressive stresses to 20 MPa or less, or 10 MPa or less. In the polishing process, it is possible to select whether or not to polish each surface, and the polishing thickness of the first surface and the second surface can be adjusted differently. Thus, the compressive stress of the surface in contact with the tin bath and the surface not in contact with the tin bath can be controlled individually. For example, by polishing more the surface with relatively high compressive stress, it is possible to more easily control the deviations in the compressive stress between the surfaces.

The polishing of the surface of the glass article may be used in combination with the etching. For example, if the compressive stress at the first surface is greater or is expected to be greater than the compressive stress at the second surface after the etching of the glass article, the first surface may be polished to reduce the compressive stress at the first surface so that it becomes substantially equal to the compressive stress at the second surface. On the contrary, prior to the etching the glass article, the polishing process may be carried out to reduce deviations in the compressive stress between the surfaces.

On the other hand, if the glass article 102 is polished using the polishing slurry 520, there may be a certain surface roughness depending on the particle size of the polishing slurry 520.

To find out the effects of the polishing process on the surface roughness of the glass article 102, two glass article samples that had been subjected to the polishing process were prepared.

Figure 17:
FIG. 17 is an image of glass article sample 1 when viewed from the top.
Figure 18:
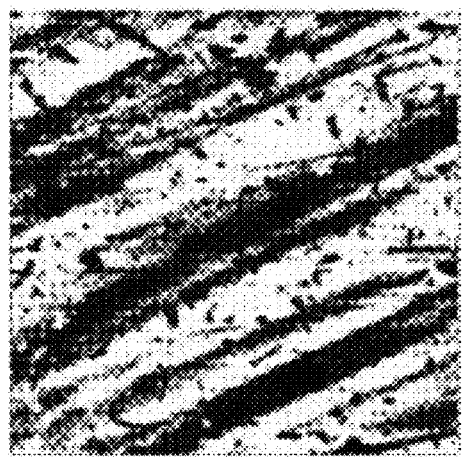
FIG. 18 is an image of glass article sample 2 when viewed from the top.

FIG. 17 is an image of glass article sample 1 when viewed from the top. FIG. 18 is an image of glass article sample 2 when viewed from the top.

It can be seen from FIGS. 17 and 18 that there are fine patterns on the surfaces of both of the samples after the polishing process.

To measure the surface roughness, the value of surface roughness Ra and the values of surface roughness Rz of glass article samples 1 and 2 were obtained. The glass article before the polishing had the value of Ra of 0.444 nm and the value of Rz of 7.1297 nm. Glass article sample 1 after the polishing had the value of Ra of 1.633 nm and the value of Rz of 44.286 nm. Glass article sample 2 after the polishing had the value of Ra of 1.404 nm and the value of Rz of 22.928 nm. Although the roughness was slightly increased by the polishing, it still lies within the range of 0.5 nm to 50 nm, which allows for the transmittance. Thus, it can be seen that the increase in the roughness due to the polishing hardly affects the optical characteristics of the glass article.

To evaluate the effects of the etching processes on the strength of the glass articles according to the exemplary embodiments, iron ball drop tests were conducted on several glass article samples. The iron ball drop tests were carried out by dropping approximately 150 g of an iron (Fe) ball onto the glass article samples to measure the drop height to break the glass article samples. The higher the drop height is, the higher the strength of the glass article sample is, which means that the sample can withstand stronger impact.

Figure 19:
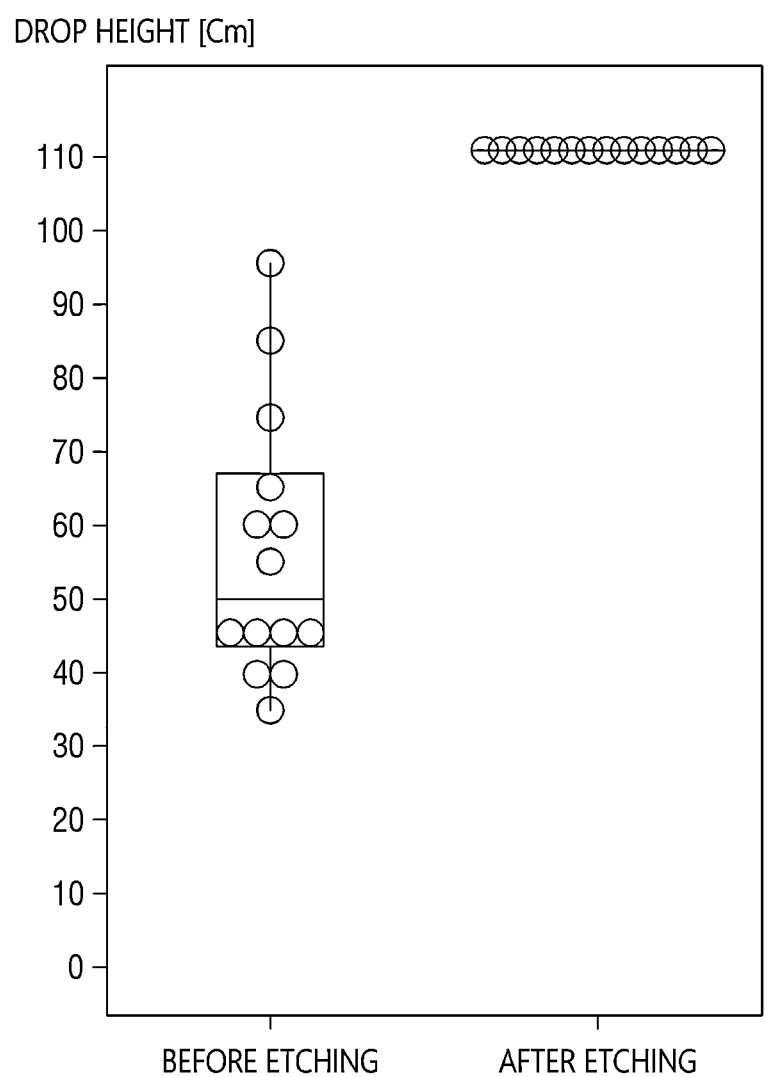
FIGS. 19 to 21 are graphs showing the results of the ball drop tests on the glass articles according to various exemplary embodiments.
Figure 20:
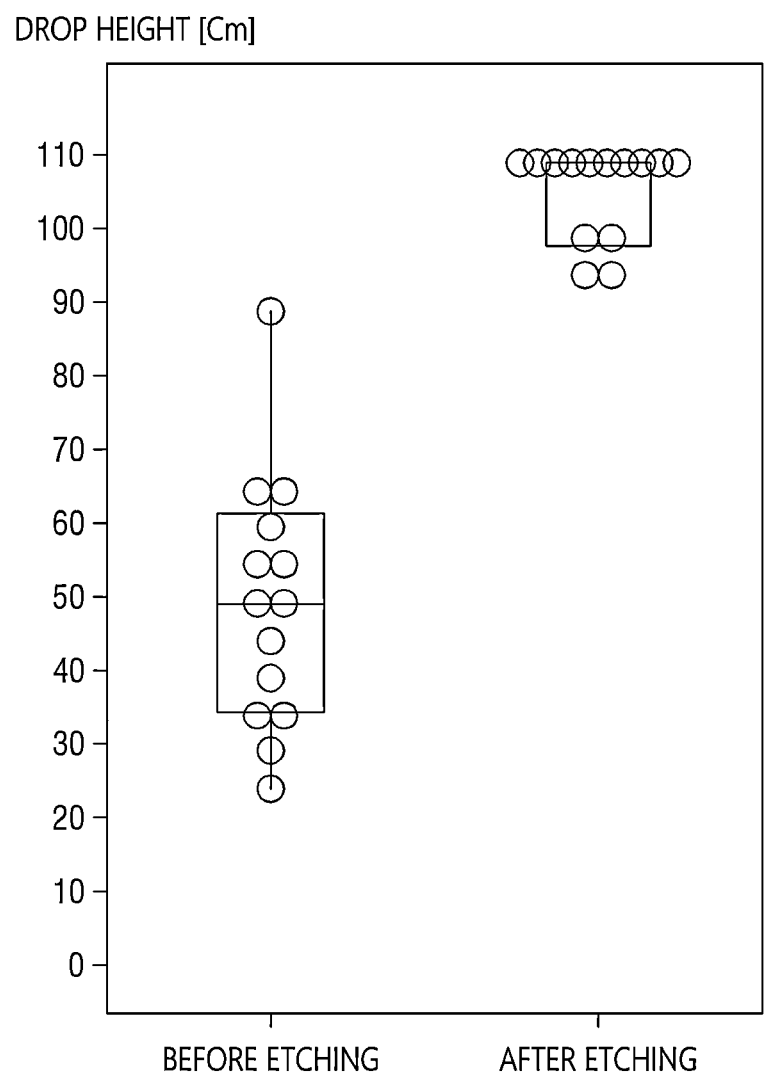
Figure 21:
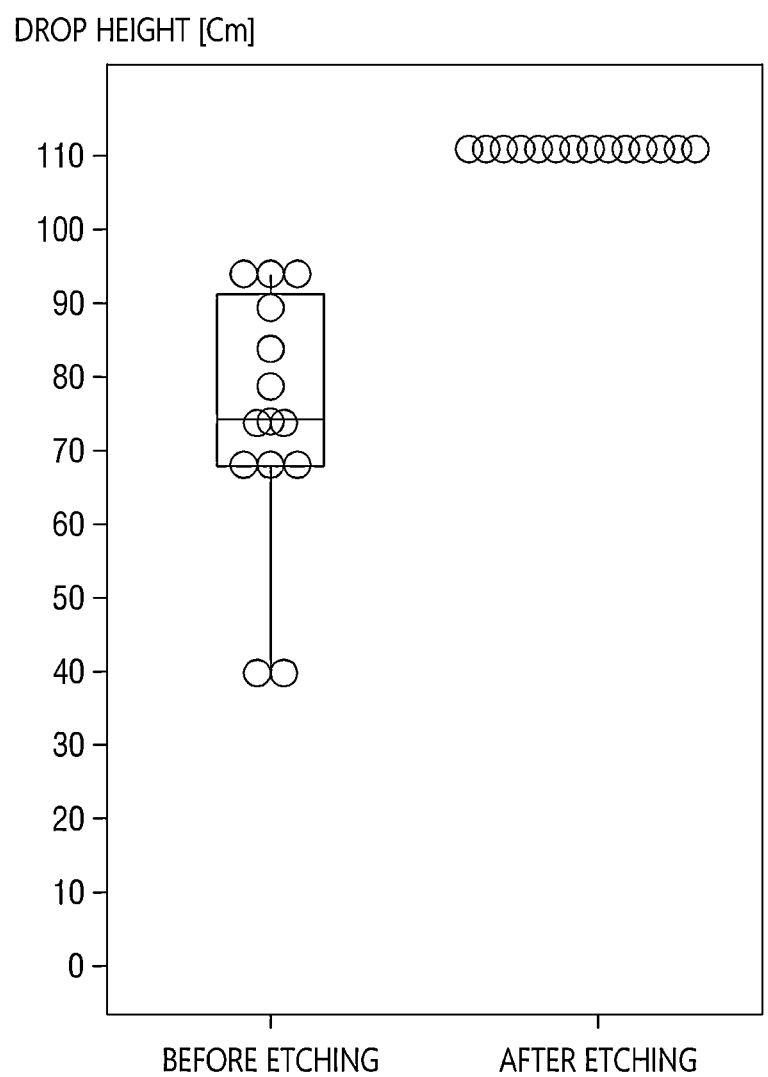

FIGS. 19 to 21 are graphs showing the results of the ball drop tests on the glass articles according to various exemplary embodiments.

The glass article samples of FIG. 19 had been subjected to a first ion exchange process in a neutral salt consisting of 70 wt % potassium nitrate ($KNO_3$) and approximately 30 wt % sodium nitrate (NaNO3) at a temperature of approximately 530° C., and then a second ion exchange process in a neutral salt consisting of approximately 100 wt % potassium nitrate ($KNO_3$) at a temperature of approximately 420° C.

The glass article samples of FIG. 20 had been subjected to a first ion exchange process in a neutral salt consisting of 70 wt % potassium nitrate ($KNO_3$) and approximately 30 wt % sodium nitrate (NaNO3) at a temperature of approximately 530° C., heat treatment at a temperature of approximately 530° C., and again a second ion exchange process in a neutral salt consisting of approximately 100 wt % potassium nitrate (KNO$_3$) at a temperature of approximately 420° C.

Similarly to the samples of FIG. 20, the glass article samples of FIG. 21 had been subjected to a first ion exchange process in a neutral salt consisting of 70 wt % potassium nitrate (KNO$_3$) and approximately 30 wt % sodium nitrate (NaNO3) at a temperature of approximately 530° C., heat treatment at a temperature of approximately 530° C., and again a second ion exchange process in a neutral salt consisting of approximately 100 wt % potassium nitrate (KNO$_3$) at a temperature of approximately 420° C. It is, however, to be noted that the heat treatment was carried out for two times longer than the glass article samples of FIG. 20.

All of the tests of FIGS. 19 to 21 were performed on 14 glass article samples before and after the etching process. In the etching process, the acid cleaning process was carried out first and then the base cleaning process was carried out.

Referring to FIG. 19, breakage heights of the glass article samples before the etching were relatively wide, ranging from approximately 35 cm to about 95 cm. Among them, as can be seen from the valid data (data belonging to the boxes of the drawing), the breakage heights of the samples before the etching were approximately 45 cm to 67 cm. In contrast, the breakage heights of the samples after the etching were uniform, i.e., 110 cm.

Referring to FIG. 20, breakage heights of the glass article samples before the etching were relatively wide, ranging from approximately 20 cm to about 90 cm. Among them, as can be seen from the valid data (data belonging to the boxes of the drawing), the breakage heights of the samples before the etching were approximately 35 cm to 60 cm. The breakage heights of the samples after the etching were approximately 100 to 110 cm.

Referring to FIG. 21, the breakage heights of the glass article samples before the etching were approximately 70 cm to 90 cm, with respect to the valid data (data belonging to the boxes of the drawing). In addition, the breakage heights of the samples after the etching were uniform, i.e., 110 cm.

It can be seen that the breakage heights of all the samples of FIGS. 19 to 21 were improved and became uniform after the etching.

In order to evaluate how the compressive stress and compressive depth vary with the etching process (the acid cleaning process and then the base cleaning process), compressive stress and compression depth before and after the etching were measured for 21 glass article samples. The results are shown in Table 1 and in the graphs of FIGS. 22 and 23.

TABLE 1

| Before Etching | | After Etching | |
| --- | --- | --- | --- |
| CS(MPa) | DOL(μm) | CS(MPa) | DOL(μm) |
| 982.8 | 75.4 | 904.5 | 75.2 |
| 950.1 | 82.5 | 891.6 | 77 |
| 948.2 | 81.5 | 899.8 | 77.4 |
| 963.8 | 76.6 | 834.5 | 81.5 |
| 947.4 | 78.2 | 858.9 | 79.4 |
| 930 | 78.2 | 853.9 | 78.2 |
| 955.9 | 78.9 | 842.7 | 78.9 |
| 968.3 | 78.3 | 879.8 | 77.6 |
| 958.4 | 78.6 | 893.9 | 78.6 |
| 959.7 | 76.5 | 874.2 | 81.1 |

TABLE 1-continued

| Before Etching | | After Etching | |
| --- | --- | --- | --- |
| CS(MPa) | DOL(μm) | CS(MPa) | DOL(μm) |
| 947.1 | 79 | 875.5 | 80.6 |
| 937.5 | 79.2 | 862.3 | 78.8 |
| 949.1 | 82 | 850.7 | 80.4 |
| 964.7 | 80.5 | 844.7 | 80.9 |
| 937.7 | 80.9 | 867.3 | 81.4 |
| 955.9 | 80.9 | 895.2 | 80.1 |
| 943.2 | 81.3 | 885.1 | 80.4 |
| 944.8 | 78 | 853.5 | 80 |
| 926.4 | 81.6 | 895.5 | 76.7 |
| 944 | 80.4 | 865.8 | 80.3 |
| 950.7 | 79.4 | 871.5 | 79.2 |

Figure 22:
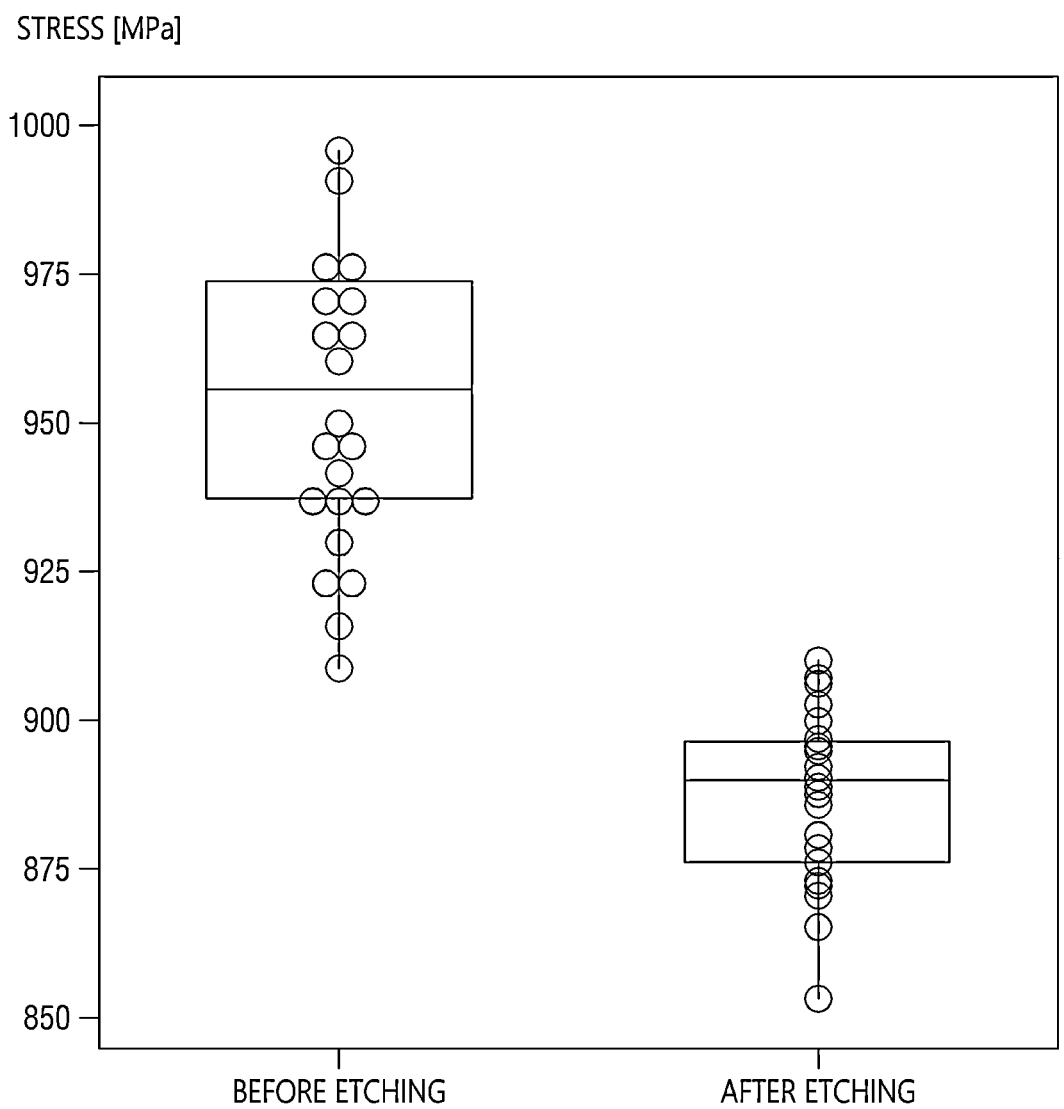
FIG. 22 is a graph showing the compressive stresses of glass article samples before and after the etching process.
Figure 23:
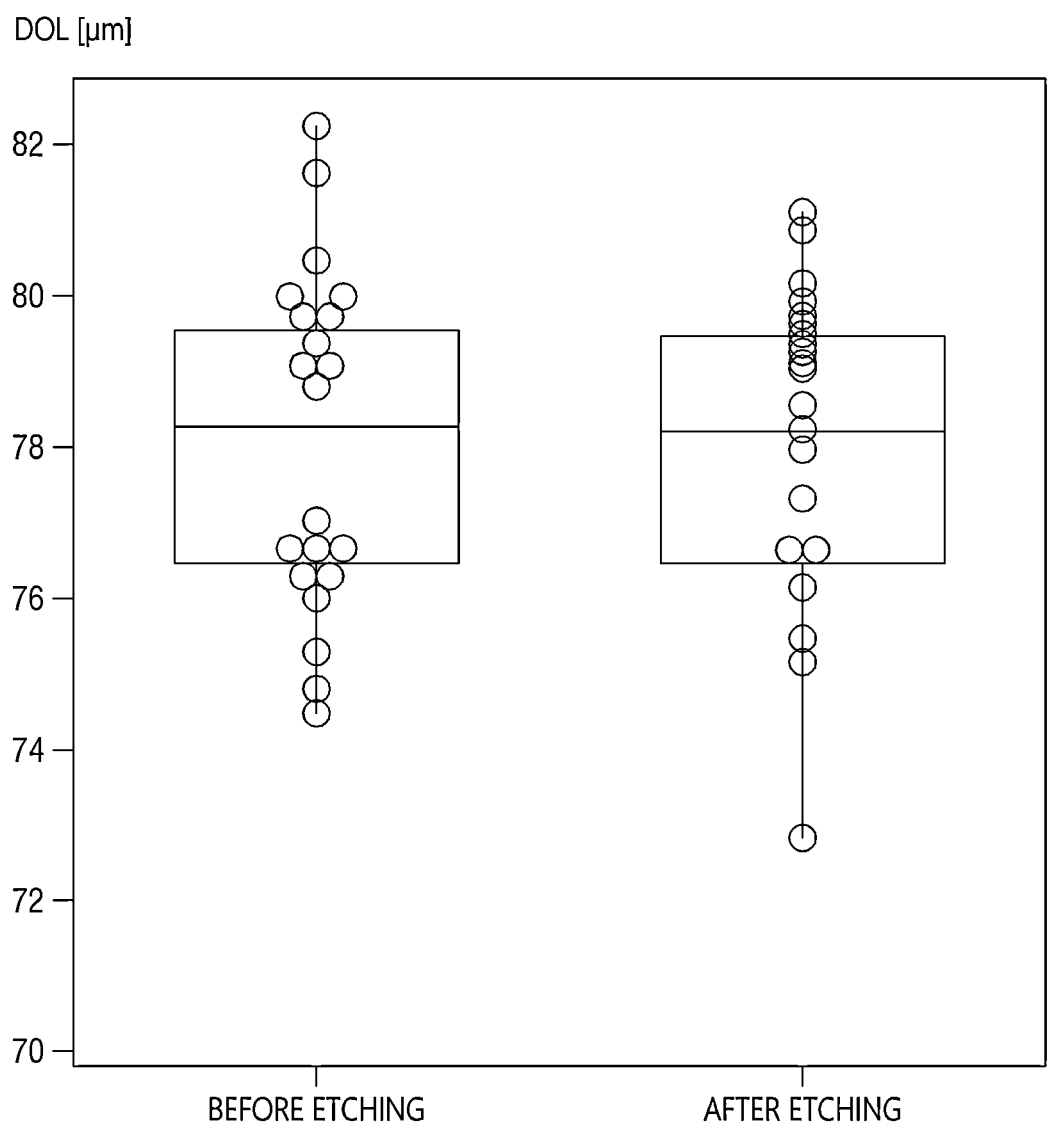
FIG. 23 is a graph showing the compression depth of the glass article samples before and after the etching process.

FIG. 22 is a graph showing the compressive stresses of glass article samples before and after the etching process. FIG. 23 is a graph showing the compression depth of the glass article samples before and after the etching process.

Referring to Table 1 and FIG. 22, the average of the compressive stresses of the glass article samples before the etching was approximately 957 MPa, while the average of the compressive stresses of the glass article samples after the etching was approximately 890 MPa, which was reduced by 60 MPa to 70 MPa in general. The distribution of the compressive stresses became narrower after the etching.

Referring to Table 1 and FIG. 23, the average of the compression depths of the glass article samples before the etching was approximately 78.3 μm, while the average of the compression depths of the glass article samples after the etching was approximately 78.2 μm. Considering the measurement errors, it is interpreted that there is no significant difference in the compression depth before and after the etching.

Next, in order to evaluate how the compressive stress and compressive depth vary with the polishing process, the compression stress and compression depth before and after the etching were measured for 38 glass article samples. The results are shown in Table 2 and in the graphs of FIGS. 24 and 25.

TABLE 2

| Before Polishing | | After Polishing | |
| --- | --- | --- | --- |
| CS(MPa) | DOL(μm) | CS(MPa) | DOL(μm) |
| 907 | 75 | 874 | 75.6 |
| 935 | 74 | 893 | 73.7 |
| 902 | 74 | 880 | 75.7 |
| 946 | 72 | 896 | 73.5 |
| 912 | 75 | 878 | 75.4 |
| 940 | 73 | 906 | 73.4 |
| 916 | 75 | 878 | 75.7 |
| 945 | 72 | 906 | 73.2 |
| 910 | 75.3 | 877 | 75.8 |
| 935 | 72.4 | 898 | 73.6 |
| 910 | 76.2 | 873 | 75.6 |
| 947 | 73.2 | 906 | 72.7 |
| 918 | 75.6 | 880 | 72.7 |
| 942 | 73.8 | 903 | 73.5 |
| 908 | 75.8 | 895 | 71.7 |
| 934 | 73.4 | 877 | 74.5 |
| 904 | 73.8 | 891 | 74.9 |
| 940 | 73.4 | 895 | 73.7 |
| 907 | 75.4 | 898 | 72.7 |
| 930 | 71.4 | 888 | 73.6 |
| 905 | 75.4 | 890 | 74.6 |
| 933 | 74.6 | 904 | 73.4 |
| 910 | 74.8 | 900 | 72.7 |
| 938 | 71.9 | 892 | 74.3 |

TABLE 2-continued

| Before Polishing | | After Polishing | |
|---|---|---|---|
| CS(MPa) | DOL(μm) | CS(MPa) | DOL(μm) |
| 902 | 75.1 | 897 | 77 |
| 927 | 72.8 | 915 | 73.1 |
| 896 | 76.1 | 933 | 72.3 |
| 932 | 71.7 | 920 | 75 |
| 924 | 73.7 | 898 | 72.7 |
| 895 | 75.3 | 888 | 73.6 |
| 897 | 75.2 | 890 | 74.6 |
| 928 | 73 | 904 | 73.4 |
| 900 | 75.1 | 900 | 72.7 |
| 928 | 74 | 892 | 74.3 |
| 932 | 72.9 | 897 | 77 |
| 902 | 75.1 | 915 | 73.1 |
| 936 | 72.7 | 933 | 72.3 |
| 903 | 75.7 | 920 | 75 |

Figure 24:
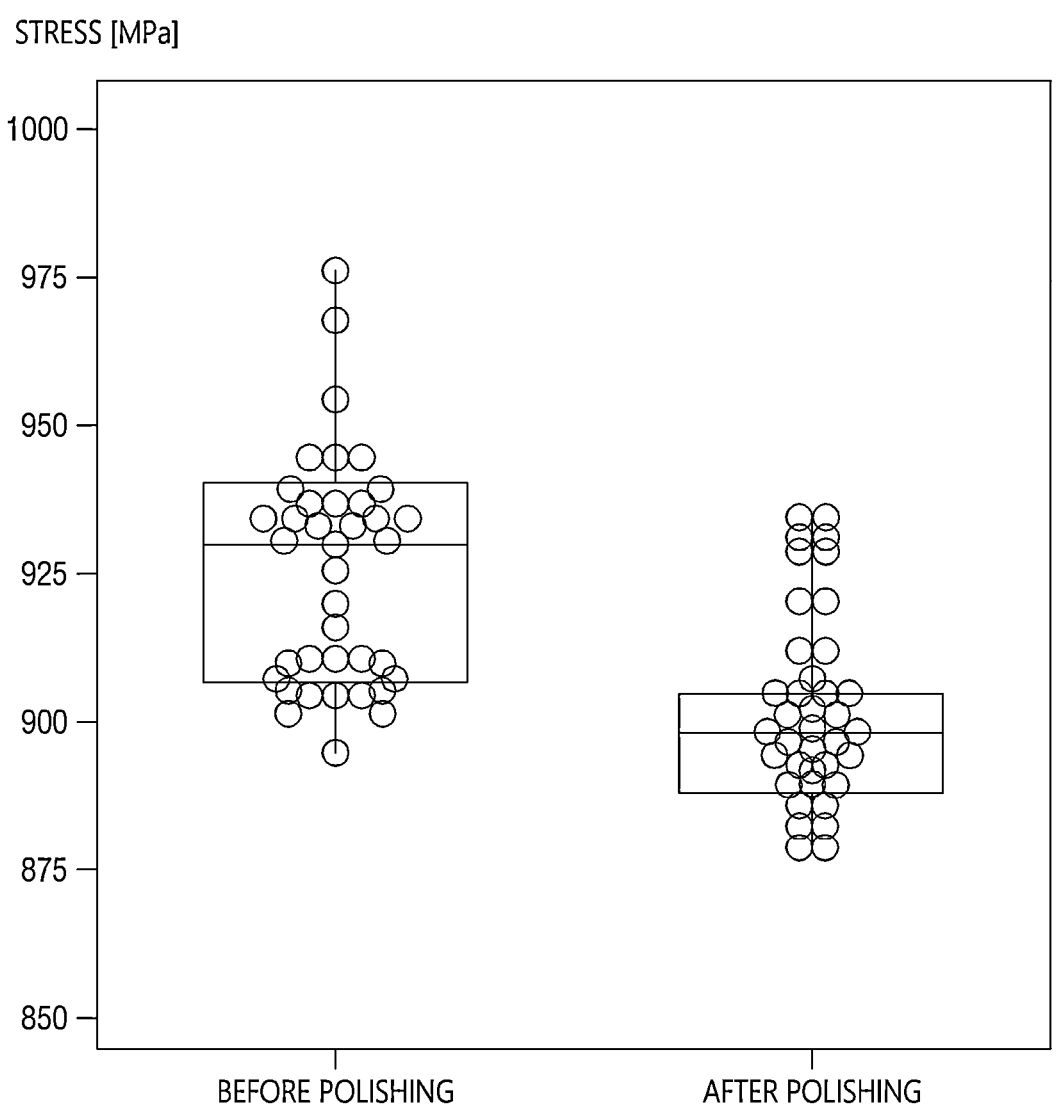
FIG. 24 is a graph showing the compressive stresses of glass article samples before and after the polishing process.
Figure 25:
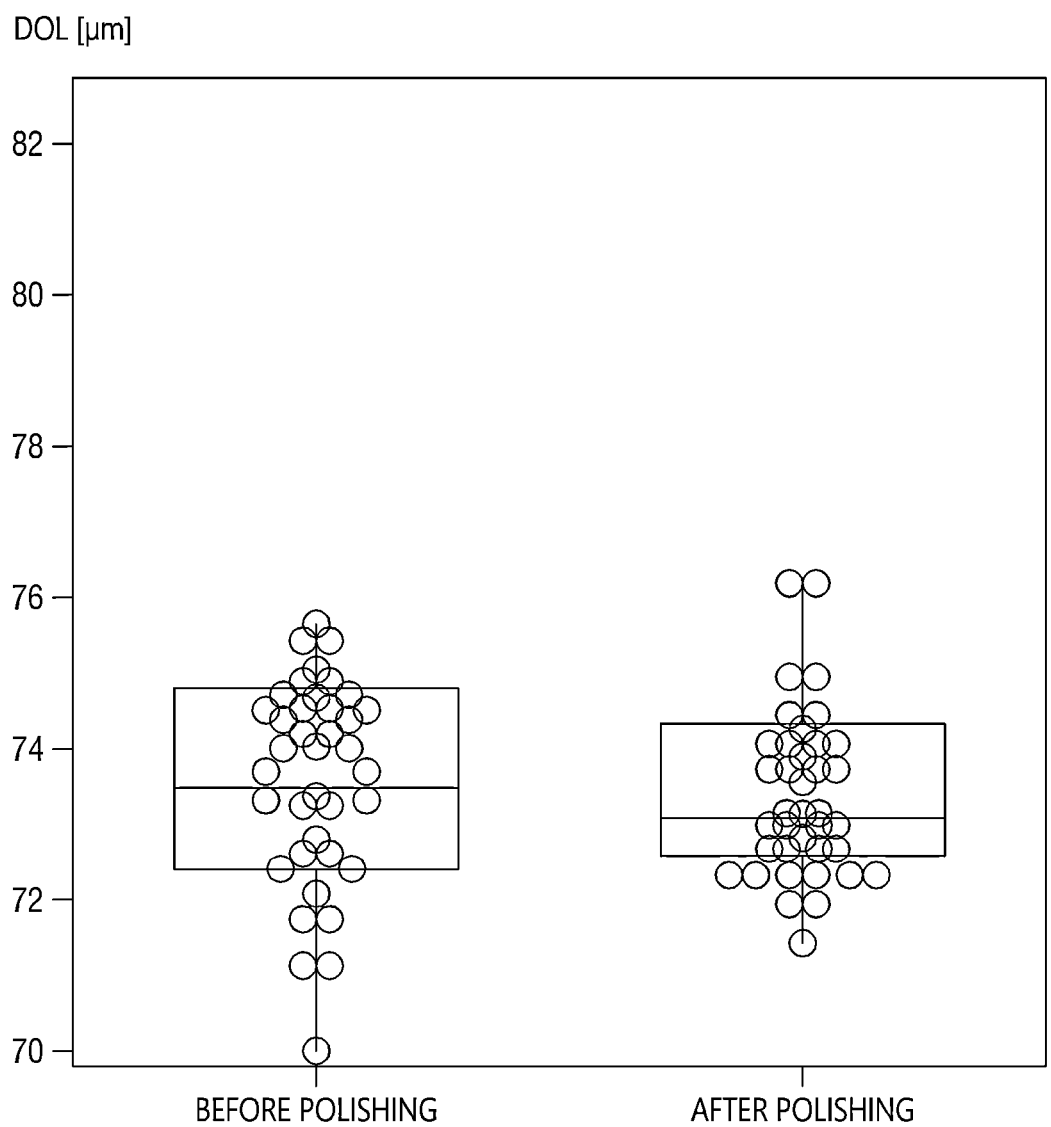
FIG. 25 is a graph showing the compressive depth of glass article samples before and after the polishing process.

FIG. 24 is a graph showing the compressive stresses of glass article samples before and after the polishing process. FIG. 25 is a graph showing the compressive depth of glass article samples before and after the polishing process.

Referring to Table 2 and FIG. 24, the average of the compressive stresses of the glass article samples before the polishing was approximately 928 MPa, while the average of the compressive stresses of the glass article samples after the polishing was approximately 897 MPa, which was reduced by 10 MPa to 50 MPa in general. The distribution of the compressive stresses became narrower after the polishing.

Referring to Table 2 and FIG. 25, the average of the compression depths of the glass article samples before the polishing was approximately 74 μm, and the average of the compression depths of the glass article samples after the polishing was approximately 74 μm, which is almost equal to the average before the polishing.

While exemplary embodiments are described above, it is not intended that these embodiments describe all possible forms of the inventive concept of the present disclosure. Rather, the words used in the specification are words of description rather than limitation, and it is understood that various changes may be made without departing from the spirit and scope of the inventive concept of the present disclosure. Additionally, the features of various implementing embodiments may be combined to form further exemplary embodiments of the present disclosure.

What is claimed is:

1. A method for producing a glass article, the method comprising:
preparing a glass to be processed, the glass comprising a glass bulk and a low-refractive surface layer disposed on the glass bulk, the low-refractive surface layer having a lower refractive index than a refractive index of the glass bulk; and
polishing a surface of the glass to form a polished glass, wherein the polishing the surface of the glass comprises: removing at least partially the low-refractive surface layer, and
wherein the polished glass, after the polishing of the surface of the glass, includes an upper surface and a lower surface both of which the low-refractive surface layer does not remain on.

2. The method of claim 1, wherein the glass comprises a first surface and a second surface opposed to the first surface, and wherein the polishing the surface of the glass comprises: polishing the first surface, and polishing the second surface.

3. The method of claim 1, wherein a thickness of the polished surface ranges from 100 nm to 1,000 nm.

4. The method of claim 3, wherein a roughness of the surface of the polished glass ranges from 0.5 nm to 50 nm.

5. The method of claim 1, wherein a thickness of the low-refractive surface layer of the glass ranges from 100 nm to 500 nm.

6. The method of claim 1, wherein a refractive index of the low-refractive surface layer is greater than a refractive index of air.

7. The method of claim 1, wherein the glass comprises a compressive region disposed adjacent to a surface of the glass and a tensile region disposed inside the glass, wherein the low-refractive surface layer is disposed in the compressive region, and
wherein a thickness of the low-refractive surface layer is smaller than a compression depth of the compressive region.

8. The method of claim 7, wherein a maximum compressive stress of the polished glass is less than a maximum compressive stress of the glass.

9. The method of claim 8, wherein a difference between the maximum compressive stress of the glass and the maximum compressive stress of the polished glass ranges from 10 MPa to 100 MPa.

10. The method of claim 7, wherein a compression depth of the polished glass is substantially equal to the compression depth of the glass.

11. The method of claim 7, wherein a maximum tensile stress (CT1) of the polished glass satisfies $$CT1 \leq -37.6*\ln(t)+48.7$$

where CT1 is expressed in MPa, and t denotes the thickness of the polished glass in mm.

12. The method of claim 11, wherein a maximum tensile stress of the glass satisfies $$CT1' > -37.6*\ln(t')+48.7$$

where CT1' is expressed in MPa, and t' denotes the thickness of the glass in mm.

13. The method of claim 7, wherein the compressive region has the maximum compressive stress at a surface of the low-refractive surface layer.

14. A method for producing a glass article, the method comprising:
preparing a glass to be processed that has a first surface and a second surface opposed to the first surface, wherein the glass has a first maximum compressive stress at the first surface and a second maximum compressive stress at the second surface; and
polishing the first surface or the second surface to reduce deviations between the first maximum compressive stress and the second maximum compressive stress, wherein the glass has no optical interface from the first surface to the second surface after the polishing.

15. The method of claim 14, wherein the glass is produced by a floating technique, and
wherein the first surface of the glass comes in contact with a floating fluid, and the second surface of the glass does not come in contact with the floating fluid.

* * * * *